(12) United States Patent
Roy

(10) Patent No.: US 7,603,705 B2
(45) Date of Patent: Oct. 13, 2009

(54) METHODS AND SYSTEMS FOR ENFORCING NETWORK AND COMPUTER USE POLICY

(75) Inventor: Shantu Roy, Cocur d'Alene, ID (US)

(73) Assignee: Next IT Corporation, Spokane, WA (US)

( * ) Notice: Subject to any disclaimer, the term of this patent is extended or adjusted under 35 U.S.C. 154(b) by 127 days.

(21) Appl. No.: 11/169,142

(22) Filed: Jun. 28, 2005

(65) Prior Publication Data

US 2006/0037076 A1    Feb. 16, 2006

Related U.S. Application Data

(63) Continuation-in-part of application No. 10/839,425, filed on May 4, 2004.

(51) Int. Cl.
*G06F 21/00*    (2006.01)
(52) U.S. Cl. .............................. 726/22; 726/25; 713/189
(58) Field of Classification Search .................. 726/22, 726/23, 25; 707/102; 704/9, 10; 713/189
See application file for complete search history.

(56) References Cited

U.S. PATENT DOCUMENTS

| | | | |
|---|---|---|---|
| 5,559,693 A | | 9/1996 | Anick et al. |
| 5,999,733 A | | 12/1999 | Shamoto |
| 6,272,531 B1 | * | 8/2001 | Shrader ..................... 709/206 |
| 6,278,996 B1 | * | 8/2001 | Richardson et al. ............ 707/6 |
| 6,405,318 B1 | * | 6/2002 | Rowland ..................... 726/22 |
| 6,937,975 B1 | | 8/2005 | Elworthy |
| 7,013,310 B2 | * | 3/2006 | Messing et al. .......... 707/104.1 |
| 7,130,831 B2 | * | 10/2006 | Howard et al. ................ 705/57 |
| 2002/0111951 A1 | | 8/2002 | Zeng |
| 2003/0018588 A1 | * | 1/2003 | Guillemin ................... 705/400 |
| 2003/0191730 A1 | * | 10/2003 | Adkins et al. ................. 706/47 |
| 2004/0123137 A1 | * | 6/2004 | Yodaiken .................... 713/200 |
| 2005/0097364 A1 | * | 5/2005 | Edeki et al. ................. 713/201 |
| 2005/0240911 A1 | * | 10/2005 | Hundley et al. ............. 717/142 |
| 2006/0004826 A1 | * | 1/2006 | Zartler et al. ............... 707/102 |
| 2008/0005157 A1 | | 1/2008 | Zartler |
| 2008/0005158 A1 | | 1/2008 | Zartler |

OTHER PUBLICATIONS

Jones, et al., "A Probabilistic Parser and Its Application", *Retrieved from* http://citeseer.ist.psu.edu/mark92probabilistic.html on Aug. 28, 2007., In AAAI Workshop on Statistically-Based NLP Techniques, 20-27.,(1992),8 Pages.

* cited by examiner

*Primary Examiner*—Gilberto Barron, Jr.
*Assistant Examiner*—Hadi Armouche
(74) *Attorney, Agent, or Firm*—K&L Gates LLP

(57) ABSTRACT

Network and computer use policy is enforced by employing client-side systems that analyze data usage at the client in terms of what the data is, who is using the data, and the context of the data, and then make an intelligent decision on what action(s) to take responsive to the analysis that is performed. Such systems and related methods can protect organizational resources from inappropriate activities that originate from within the organization.

23 Claims, 9 Drawing Sheets

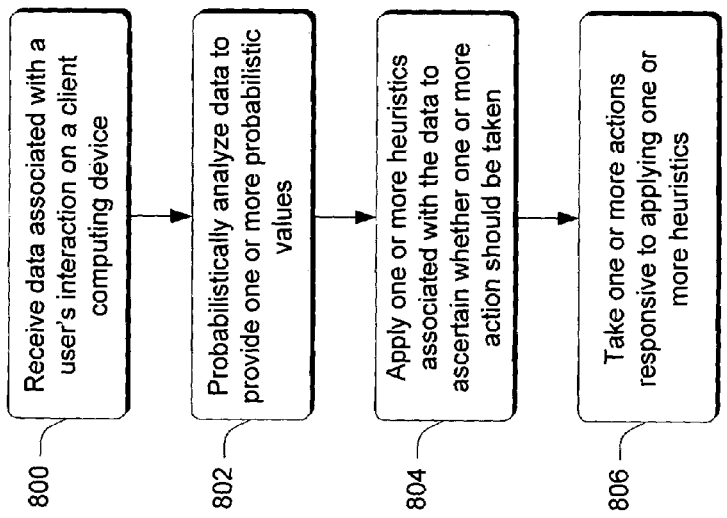

METHODS AND SYSTEMS FOR ENFORCING NETWORK AND COMPUTER USE POLICY

RELATED APPLICATIONS

Not applicable.

TECHNICAL FIELD

This invention relates generally to methods and systems for enforcing network and computer use policy.

BACKGROUND

In the past, a great deal of effort has been expended to address problems associated with protecting computing systems, such as corporate and business networks, from outside attacks. Such attacks, for example, can be waged by rogue individuals who may attempt to breach a corporate firewall to access a company's private data.

Protecting computing systems from the other side of the fence—that is, from the inside—from activities undertaken by insiders is somewhat of a different problem. Specifically, those who are insiders, such as employees, officers and the like, typically embody some level of trust within the organization. Yet, the very trust that an individual may have from the organization may place the individual in a position to exploit that trust and undertake activities that are not in the organization's best interest. For example, a rogue insider may attempt to use organization computing resources to steal or maliciously tamper with the organization's resources.

SUMMARY

Network and computer use policy is enforced by employing client-side systems that analyze data usage at the client in terms of what the data is, who is using the data, and the context of the data, and then make an intelligent decision on what action(s) to take responsive to the analysis that is performed. Such systems and related methods can protect organizational resources from inappropriate activities that originate from within the organization.

BRIEF DESCRIPTION OF THE DRAWINGS

FIG. 8 is a flow diagram that describes steps in a method in accordance with one embodiment.

DETAILED DESCRIPTION

Overview

Figure 1:
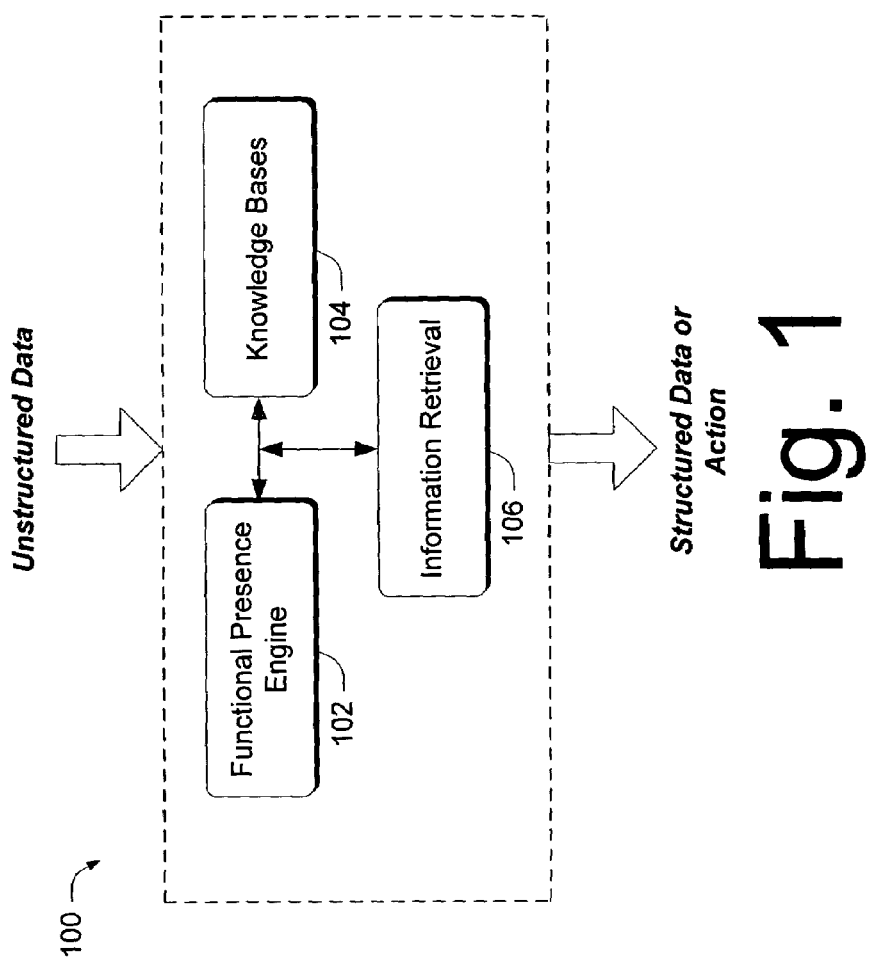
FIG. 1 is a block diagram illustrates components of a system in accordance with one embodiment.

In the embodiments described below, network and computer use policy is enforced by employing client-side systems that analyze data usage at the client in terms of what the data is, who is using the data, and the context of the data, and then make an intelligent decision on what action(s) to take responsive to the analysis that is performed. In the illustrated and described embodiments, both client-side and server-side components can be employed.

On the client-side, a component known as a flex engine or functional presence engine receives and analyzes data associated with user activities on the client. The flex engine looks at the data it receives in a probabilistic manner in order to ascertain and identify data that is most likely of interest. Once such data is identified, it is provided to a decision framework component that heuristically analyzes the data to produce one or more actions that are performed. Such actions can include everything from committing a user's activities to a log to shutting down an associated application or the computing system.

The network and computer use policy embodiments are described under the heading "Active Sentry" towards the end of this document. Before describing these embodiments, however, a foundational technical discussion is provided to give examples of how the Active Sentry embodiments can be implemented. It is to be appreciated and understood that the Active Sentry embodiments can be implemented in other ways without departing from the spirit and scope of the claimed subject matter.

As an overview now, various embodiments described in this document can utilize a state-based, regular expression parser that is designed to deal with language, data, text and text types. In the examples that are described in the following sections, text is used to illustrate the processing that takes place. It is to be appreciated and understood that data, such as that generated from user's interaction with their computing device, can be used as well. Thus, in the Active Sentry embodiments, such data is used in the processing that takes place.

In accordance with at least one embodiment, data such as text is received into the system and undergoes a tokenization process which permits structure to be imparted to the data. As the data undergoes the tokenization process, portions of the data (e.g. individual words of text) are assigned different types. As an elementary example consider that individual words can be considered as parts of speech—such as nouns, verbs, prepositions and the like. Thus, a very elementary system might be set up to tokenize individual words according to their respective part of speech. Perhaps a better example is to consider that different nouns can be tokenized as types of nouns, e.g. places, dates, email addresses, web sites, and the like.

Tokenizing data creates patterns in the language which, in turn, can allow simple key words searches or searching for different type objects such as date objects, place objects, email address objects and the like. The tokenization process is effectively a generalized abstraction process in which typing is used to abstract classes of words into different contexts that can be used for much broader purposes, as will become apparent below.

FIG. 1 shows, generally at 100, an exemplary software architecture or system that can be utilized to implement various embodiments described above and below. The software architecture can be embodied on any suitable computer-readable media.

In this particular example, system 100 comprises a functional presence engine or flex engine 102, one or more knowledge bases 104 and, optionally, an information retrieval module 106. In accordance one embodiment, system 100 receives unstructured data and processes it in a manner that imparts a degree of useful structure to it. The output of system 100 can be one or more of structured data and/or one or more actions as will become apparent below. Each of these individual components is discussed in more detail below under their own respective headings.

Functional Presence Engine or Flex Engine

In accordance with one embodiment, the functional presence engine or flex engine (both used interchangeably) 102 is implemented as a probabilistic parser that performs lexical analysis, using lexical archetypes, to define recognizable patterns. The functional presence engine can then use one or more stimulus/response knowledge bases, such as knowledge bases 104, to make sense of the patterns and react to them appropriately. In accordance with one embodiment, system 100 can learn or be trained by either changing the lexical archetypes and/or the knowledge bases.

Lexical Analysis

The discussion below provides but one exemplary implementation example of how lexical analysis can be performed in accordance with the described embodiment. It is to be appreciated and understood that the description provided below is not intended to limit application of the claimed subject matter. Rather, other approaches can be utilized without departing from the spirit and scope of the claimed subject matter.

Figure 2:
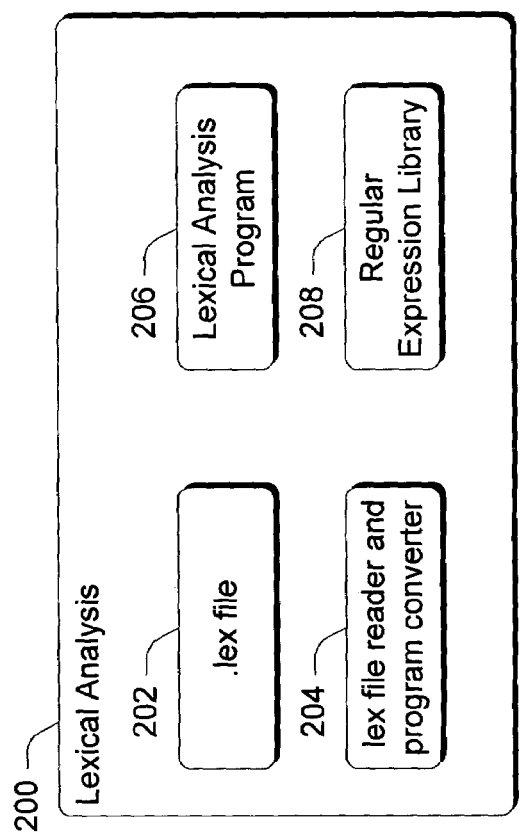
FIG. 2 is a block diagram that illustrates components that can be used for conducting lexical analysis in accordance with one embodiment.

In accordance with one embodiment, lexical analysis is performed utilizing a system, such as the system shown generally at 200 in FIG. 2. System 200 comprises, in this embodiment, an external .lex file 202 which specifies a series of rules and their output symbols, a program 204 to read the .lex file and convert it into a program which, in this example comprises a C++ lex-program, a lexical analysis program 206 which, when provided with data such as text, produces tokenized content in the format specified in the lex file, and an independent regular expression library 208.

The .lex File

In accordance with one embodiment, the .lex file 202 comprises a structure having two component parts: a macro section and one or more lex sections. In the illustrated and described embodiment, the .lex file is case sensitive, as are the regular expressions embodied by it. The macro section specifies symbol rewrites. The macro section is used to create named identifiers representing more complicated regular expression patterns. This allows the author to create and re-use regular expressions without having to rewrite the same patterns in more than one place. Macros keep the lex sections cleaner and allow common expressions to be changed in only one place. As an example, consider the following.

```
%macro
    regular_expression → macro-name
    regular-expression1 → macro-name1
```

This is a valid example macros section.

```
%macros              // begin macros
\t\n\f\r,'- →wb     //macros!
\!\?\:\;\." →sb     //more macros
```

With respect to the lex section, consider the following:

```
%lex optional_name
    regular_expression1 → output_specifier [,output_specifier...]
    regular_expression2 → output_specifier [,output_specifier...]
    regular-expression3 → output_specifier[,output_specifier...]
    optional name → output_specifier [,output_specifier...]
```

"% lex" denotes the beginning a section of lexical rewrite rules. In some cases it is desirable to specify a name. This is explored in more detail below. On the lines following the "% lex" tag, a series of rules are specified. These rules specify a regular expression followed by a series of output symbols. As an example, consider the following:

([[:alpha:]]+)[:wb:]+→WORD{1}

The left hand side of this expression is a regular expression. In this example, notice a ":wb:" on the left hand side which specifies a macro. Macros are specified using the format ":macro-name:". A preprocessor will substitute the macro value wherever it finds a macro name surrounded by colons. A special case construct is when the rule expression matches the name specified in the "% lex tag". This is a pass through rule, meaning that if no other rule matches, this default rule will consume the entire text and call the output specifiers with the entire text. There are some cases where this is useful, such as when the % lexer will never be a top level program. In accordance with one embodiment, a known regular expression engine is utilized and is referred to as the public domain engine PCRE 3.9, which will be known by the skilled artisan.

Continuing, after the regular expression appears a "→" followed by a series of output specifiers. In the above example, a match of the given regular expression produces the output symbol, "WORD" and the output text {1}. The brackets and numeric identifier are optional. These specify which sub-expression is output with the symbol. In the illustrated and described embodiment, sub-expressions are the text which matches regular expressions within parentheses. In this example, the text which matches ([[:alpha:]]+) would be output along with the token "WORD". If the above example were changed to:

([[:alpha:]]+)[:wb:]+→WORD then the output token would be the same, but then the entire match would be returned as the text. This is same as writing "WORD {0}". As another example, consider the following:

([[:alpha:]]+)([:sb:]+)→WORD {1}, EOS {2}//
    WORD and EOS

The example pattern above matches alpha characters, followed by the macro:sb:, which is defined in our example to be sentence boundary tokens. When text followed by a period occurs, two tokens are output—the WORD token and an end of sentence (EOS) token. This demonstrates how a single match can produce more than one token. There is no limit on the number of tokens which can be output, except as guided by practicality. As another example, consider the pattern appearing just below:

[^:wb:]+→GWORD

This pattern looks for any character that is not a word boundary character and outputs a GWORD token, and the output text is the entire match.

Putting the entire lex construct together, consider the following:

```
%lex main
([[:alpha:]]+)[:wb:]+      →WORD{1}
([[:alpha]]+)([:sb:]+)     →WORD{1}, EOS {2} // WORD and EOS
[^:wb:]+                   →GWORD //generic graphic word
```

In this particular example, when the lexer runs, it chooses the rule which matches the most text as the rule which will trigger the output token. Options may be added later to control this behavior. This lexer will output text words, end of sentence markers, and graphic words.

For handling large volumes of text, it is important to keep the main lexer simple. That said, in some scenarios, it can be desirable to tokenize things such as EMAIL, MONEY, IP addresses and URLs. The following simple rules are provided as an example of rules that tokenize such things.

```
([a-zA-ZO-9._-]+)@(([a-zA-ZO-9._-]+\.)+[a-zA-ZO-9._-]{2,3})
    →EMAIL
[$](\d]+\.[\d]*) →MONEY
[\d]{1,3}\.[\d]{1,3}\.[\d]{1,3}\.[\d]{1,3} → IP
((http|https)://)?([a-zA-Z0-9._-]+\.)+[a-zA-Z0-9]{1,3} → URL
```

To address efficiency and performance issues, format utilized for lexical analysis can add some additional constructs. Recall from above that the file can specify one or more % lex constructs. This being the case, consider the following.

Instead of putting the four rules listed above into the "main" lexer, the rules Can instead be added to a sub-lexer as follows:

```
%lex GWORD
([a-zA-Z0-9._-]+)@(([a-zA-Z0-9._-]+\.)+[a-zA-Z0-9]
{2,3}) →EMAIL
[$](\d]+\.[\d]*) →MONEY
[\d]{1,3}\.[\d]{1,3}\.[\d]{1,3}\.[\d]{1,3} → IP
((http|https)://)?([a-zA-Z0-9._-]+\.)+[a-zA-Z0-9]{1,3} → URL
```

Using this format, the entire file would look as follows:

```
%macros                     // begin macros
\t\n\f\r ,'-       -> wb    // macros!
\!\?\:\;\.\"       -> sb    // more macros
%lex main
([[:alpha:]]+)[:wb:]+    →   WORD{1}
([[:alpha:]]+)([:sb:]+)  →   WORD{1}, EOS{2} // WORD and EOS
[^:wb:]+ →GWORD{0} // generic graphic word
%lex GWORD
([a-zA-Z0-9._-]+)@(([a-zA-Z0-9._-]+\.)+[a-zA-Z0-9]
{2,3}) → EMAIL
[$](\d]+\.[\d]*) → MONEY
[\d]{1,3}\.[\d]{1,3}\.[\d]{1,3}\.[\d]{1,3} → IP
((http|https)://)?([a-zA-Z0-9._-]+\.)+[a-zA-Z0-9]{1,3} → URL
```

In this file, there are two lex programs. Generally, the "main" lex is the only lexer executed at the top level of the text tokenization process. The rules under the % lex GWORD in general will not execute. However, make note of the fact that the rule "[^:wb:]+→GWORD{0}" has the output token of GWORD and note that the new % lex construct has the name GWORD. This specifies a recursive lex procedure. When GWORD is the matched construct from "main", that is, no other rule matches more text, before outputting GWORD, it will first try to match all the lexical rules under the % lex GWORD tag. This is analogous to a procedure call in a programming language. The data that gets passed in is the text specified in the output—in our case GWORD{0}, the entire matched text. From a performance standpoint, there is only a performance hit when we find special graphic words. For alpha-only words, the GWORD lexer will not run.

In addition to the constructs described above, in at least one embodiment, other constructs can be utilized. These constructs can control which lexers lexically process the data first. As an example, consider the construct "% push lexername, % pop". In accordance with one embodiment, the lexer program can maintain a stack of lexers. Lexers which are on the execution stack are evaluated by a top level parser. Lexers which are not on the execution stack are not evaluated unless recursive tokenization occurs. It is possible to push new lexers onto the stack in order to read specific data and then pop them when finished, as will be appreciated by the skilled artisan.

To demonstrate this, the code listing below is a text representation of the actual .lex file parser in the lex language. The main lexer is either the % lex named "main" or the first % lex encountered in the file. In the present example, both conditions are satisfied by the first-encountered lexer. In the illustrated and described example, the % lex main program looks for "% macro" specifiers or "% lex" specifiers, comments, or extra white space.

When a % macro is encountered, it emits a symbol "MACRO", then pops anything on the stack, and then pushes the % lex READ_MACRO program onto the top of the stack. The Rules in % lex READ_MACRO will now get the first chance to evaluate the incoming data or text. If READ_MACRO fails to match, then % lex main will also have an opportunity to evaluate the incoming data or text.

When a % lex is encountered, the same process occurs, except the top program becomes READ_LEX. READ_lex looks for rules and, if encountered, it tokenizes the REGEX of the rule, and then pushes READ_LEX_RULE to read the right hand side of the rule. This demonstrates the recursive capabilities of the system. The program, on certain input conditions, triggers a state change to a specialized sub lexer which is capable of parsing a specific type of data. The sub lexer will process the data and then perform a % pop operation when the sub lexer has completed it's task.

If READ_LEX_RULE encounters some non-white, non-comment text, it gathers it, and calls the LEX_TOKEN program with the gathered text. LEX_TOKEN looks for % push, % pop, xxx{digit}, or xxx. In the illustrated and described embodiment, LEX_TOKEN is not on the stack though. Rather, it is a sub-component that is executed based on the text gathered by the parent, as described above.

Consider now the additional construct "% lex default", which is a program that is specified at the bottom of the code listing below. In accordance with one embodiment, these constructs will only execute if the text cannot be tokenized using the execution stack. In the present example, this program is utilized to indicate a syntax error.

```
// This program is the lex specification for a lexer that
// reads the "lex" file.
// main lexer
%lex main
\%macros[ \t]* -> MACRO, %pop, %push READ_MACRO
\%lex[ \t]*([A-Za-z0-9_]*)[ \t]* -> LEX{1}, %pop, %push READ_LEX
//.*               -> // ignore
[ \t\r\n]+         -> // ignore
// read macro lexer
%lex READ_MACRO
[ \t]*(.+)[ \t]*-\>+[ \t]*([A-Za-z0-9_]*) -> MACRONAME{2}, MACROVALUE{1}
// read lex rules
%lex READ_LEX
[ \t]*(.+)[ \t]*-\>         ->     RULE_RE{1},      %push READ_LEX_RULE
// read a single lex rule
%lex READ_LEX_RULE
[\r\n]                      -> %pop              // done reading a rule
[ \t]*//.*                  -> %pop
[ \t[:alnum:]_\{%\}]+ ->   LEX_TOKEN{0} // recursive descent into
                                        // %lex LEX_TOKEN with the string
 ,                         -> // ignore
// read a single lex token
%lex LEX_TOKEN // lex_token program
// this is called to perform a subrecognition on lex token output forms
// it is not in the top level parser stack
[ \t]*%push[ \t]+(.*)[ \t]* -> STACK_PUSH{1}
[ \t]*%pop[ \t]*$", -> STACK_POP
[  \t]*([A-Za-z0-9_]+)\{[  \t]*([0-9]+)[  \t]*\}[  \t]*   ->   TOKEN{1}, TOKENPARAM{2}
[ \t]*([A-Za-z0-9_]+)[ \t]*$ -> TOKEN{1}
%lex default   // default is ONLY hit when no other lexers on the stack evaluate
               // in this case we want to spit a syntax error
// at this point, any text is considered a syntax error
.*              -> SYNTAX_ERROR
```

How .lex Matches

In accordance with one embodiment, under a given .lex program, the default methodology is to attempt to match all the regular expressions in the %lex group and choose the rule which consumes the most input. In accordance with one embodiment, however, a program directive "% pragma" can be utilized to specify behaviors for the analysis system. For example, a %pragma firstmatch before the %lex tag indicates that the matching behavior should be to choose the first rule which successfully matches the incoming text. This can improve performance but can significantly impact the matching process.

The syntax of this program directive is: % pragma pragma_name. The following pragmas (case-sensitive) are currently defined:

| Pragma | Definition |
|---|---|
| %pragma firstmatch | The %lex tags and rules below this %pragma are matched using the "first match" strategy. That is, the first rule which is able to match the incoming text is the rule which will fire, other rules are ignored. This is for performance. It is not the default behavior. |
| %pragma bestmatch | The %lex tags and rules below this %pragma are matched using the "best match" strategy. All the rules of a particular %lex group are used. The rule which matches the longest string will be the rule which is fired. This is the default behavior. |

Implementation Details

The following discussion is provided to describe one particular implementation example of the system shown in FIG. 2. This example is not intended to limit application of the claimed subject matter to specifically described example. Rather, this example is provided as a guide to the skilled artisan as but one way certain aspects of the described embodiments can be implemented.

First, in accordance with one embodiment, to utilize the lexer or the regular expression engine singularly, the user should consider the following classes, each of which is discussed below under its own separate heading:

CRegex—regular expression engine. This class allows the user to set the regular expression and then search a string of data for the expression.

lex_program—a C++ implementation of the features provided in the .lex file format lex_program_compiler—a compiler that produces a lex_program from a .lex stream lextoken—output data from the lex_program. An individual token of data.

CRegex

In accordance with one embodiment, this class is a self-contained class for matching strings of text to a regular expression. Like all C++ classes in the Lex library, CRegex supports value class semantics, assignment, and copy construction. All of these operations are valid and tested.

In accordance with one embodiment, the member methods in this class include a compile method, a match method, a getMatches method, and a GetLastError method, each of which is described below.

CRegex::compile bool compile (const char* szRE, int flags, long* pFailureOffset=NULL);

This method compiles the specified regular expression, given in szRE, and flags.

Parameters szRE—[in] pointer to a per 15 compatible regular expression flags—[in] modifier flags for compilation

| | |
|---|---|
| lexer::anchored | The pattern is forced to be "anchored". That is, the pattern is constrained to match only at the start of the string which is being searched (the "subject string"). This effect can also be achieved by appropriate constructs in the pattern itself. |
| lexer::caseless | Letters in the pattern match both upper and lower case letters. |
| lexer::dollarend | A dollar metacharacter in the pattern matches only at the end of the subject string. Without this option, a dollar also matches immediately before the final character if it is a new line (but not before any other new lines). This option is ignored if lexer::multiline is set. |
| lexer::multiline | By default, CRegex treats the subject string as consisting of a single "line" of characters (even if it actually contains several new lines). The "start of line" metacharacter (^) matches only at the start of the string, while the "end of line" metacharacter ($) matches only at the end of the string, or before a terminating new line (unless lexer::dollarend is set). | pFailureOffset—[in, out] a pointer to a integer variable that will receive the offset if the string failed to compile. This may be useful for custom error handling. The return value is undefined if the compilation succeeds.

Return Value bool—true if the compilation was successful, false otherwise. Use CRegex::GetLastError( ) to retrieve a more detailed error message.

CRegex::match long match (const char* szText, long inLen, int flags=0)

This method attempts to match the compiled regular expression stored in the class object with the specified text given the length of text. It returns the number of characters consumed by the match. It will return 0 if the match failed. As an example, if "this" is the text to match and the string is as follows, "blah this is fun", then match will return "9"—the position past the last match.

To retrieve more detailed information about the match, the method CRegex::getMatches, described below, can be utilized after performing the match.

Parameters szText—[in] data to match against inLen—[in] number of characters in the szText to analyze. Use −1 if szText is null terminated and you wish to match up to the end of string.

flags—[in]

| | |
|---|---|
| Lexer::notbol | The first character of the string is not the beginning of a line, so the circumflex metacharacter should not match before it. Setting this without lexer::multiline (at compile time) causes ^ never to match. |
| Lexer::noteol | The end of the string is not the end of a line, so the dollar metacharacter should not match it nor (except in multi-line mode) a newline immediately before it. Setting this without lexer::multiline(at compile time) causes dollar never to match. |

Notes

The return value is somewhat unintuitive. It returns the pointer to the next character after the end of the matched text. Just note that a non-zero value means there was a match. To get specific information about exactly where the match occurs, call CRegex::getMatches anytime after the call to CRegex::match.

Returns long-number of characters consumed by the match process—0 if no match.

CRegex::getMatches long getMatches (int** ppMatches);

Call this method after calling CRegex::match to get a pointer to the list of matches (submatches). It returns, in ppMatches, a pointer to the internal list of matches retrieved after the last match. It also returns the number of valid matches.

Each call to match only matches the regular expression once. Callers will need to iterate to find all the particular matches. The getMatches method returns positional information about where the match occurred in the text. The first two integers specify the start position and end position of the whole match. The next "n" integers return position of all submatches in the source string. As an example, consider the following:

RE: ([[:alpha:]]+)([\d]+)

Subject string: "Mark123 is here"

CRegex::match returns: 7 indicating success getMatches returns 3. This list of integers looks like this:

[0]—0

[1]—7

[2]—0

[3]—4

[4]—7

Parameters ppMatches—[out] a live pointer to the matches. This pointer dies with the class or when the matcher is recompiled.

Returns

The number of matches: 1 (whole match)+number of submatches. 0 if there was no match in the last call to CRegex::match Notes The returned match list is a class object which goes out of scope with the class, or when the CRegex::compile is called.

CRegex::GetLastError std::string GetLastError( ) const;

This method returns the compilation error if any. It returns a string that specifies where in the regular expression the compilation failed and is useful for debugging compilation errors.

lex_program

In accordance with the described embodiment, lex_program is the C++ lexical analyzer and is used to tokenize data sources. The lex_program can be created from scratch or compiled from a file using a lex_file_compiler. The member methods of this class include a lex_program method, a Tokenize method, a Begin method and a GetNextTokens each of which is described below.

lex_program::lex_program lex_program::lex_program(ulong lexOptions =0)

Parameters lexOptions—[in]. Flags to control the behavior of the program.

| | |
|---|---|
| Lexer::opt_lineCounts | The lexer will manually keep track of character and line position. Lextoken's returned from this program will contain valid charNum and lineNum fields. This should only be used when this information is important, otherwise it is not recommended because there is a modest performance hit involved in keeping track of this information. |
| lexer::opt_firstMatch | This option instructs the lex program to prefer first matches. (See how matching occurs). This is usually controlled by the input .lex file and the lexer::lexer class. It is recommended that this value be set in the lexer class and not here. | lex_program::Tokenize virtual bool Tokenize(const spchar* pData, ulong length, std::vector<lextoken>& vcTokens, bool bResetState=true);

Given source text, this method tokenizes the source data and returns lextokens.

Parameters pData—[in] pointer to the data to be tokenized length—[in] length of data to be tokenized vcTokens—[out] list of tokens generated by the content. Tokens are appended to the end of it.

Remarks This method tokenizes the entire content. It is an alternative or simplification to calling lex_program::begin( ), and then lex_program::get_next_token( ) iteratively until it returns false.

lex_program::Begin virtual bool Begin(const spchar* pData, ulong length, bool bReset=true);

This method is used to set the source data for the lexical analysis. Call this before calling lex_program::GetNextToken. It is not necessary to call this method if using lex_program::tokenize.

Parameters pData—[in] pointer to the data to be tokenized length—[in] length of data to be tokenized bReset—[in] reset the stack and variable state of the lexer back to default.

Returns true lex_program::GetNextTokens virtual bool GetNextTokens(std::vector<lextoken>& toks);

This method is used to retrieve the next token from the input stream. It may return more than one token. Use this function to iteratively run through the data in as atomic a way as possible. This method returns (true) until the end of data is reached. It is possible that the return token list is empty even if the return value is true.

Parameters

Toks—[out] vector of tokens. New tokens are appended onto this list and the list is NOT CLEARED by this method, users must clear the list manually if this is the desired effect.

Returns false when the entire string has been tokenized, to the best of the programs ability.

Remarks

Lex_program::begin( ) must be called before calling GetNextTokens.

lex_program compiler

The class lex_program_compiler is a class that converts a stream of text in .lex format (described above) into a lex_program which can be used for lexical analysis. The member methods in this class include a compil_lex method described below.

lex_program_compiler::compile_lex bool compile_lex(const char* pData, long nDataLength, lex_program& lexProgram, std::vector<lexfileerror_t>& errors);

Given a pointer to lex formatted data and a data length, returns an instantiated lex program capable of tokenizing streams as specified in the pData.

Parameters pData—[in] pointer to the data. Use NextIt::LoadDiskFileIntoString( . . . ) or some other disk file loading method to load the lex file into memory.

nDataLength—[in] number of .lex formatted bytes contained in the pData pointer lex_Program—[out]—compiled program errors—descriptive list of errors, if any.

Returns bool—true if the compiled succeeded without errors or warnings. The application is responsible for determining if errors or warnings warrant a stoppage. Recommended: stop and display errors.

lextoken

This data class is the return class of the lex_program and represents a token. It is designed for efficient parsing. In addition to returning a token constant, it also returns positional information and length information of the source text that produced the token, which is important for language processing.

```
Member data
lexfilepos_t          startPos
typedef struct
{
ulong lineNum;        // 0 based line number
ulong charNum;        // 0 based character index
ulong pos;    // absolute position in the buffer
} lexfilepos_t;
```

This is the starting information within the source data. If the lex_program was created with the lexer::opt_lineCounts, the lexfilepos_t will also contain a valid character and line number. startPos.pos specifies the exact byte position in the source data.

long length;

This is the length in bytes of text representing this token.

An example usage of the file position information would be to create a string representing the exact characters captured by the token. Such as: std::string str(&pData[tok.startPos.pos], tok.length);

ulong idToken

This is the unique identifier for this token. The id is a unique hash value defining the lexical token, or type, which the lexer has recognized. In this implementation, the hashing program is the system hasher used by many subsystems, WordHashG.

Knowledge Bases

As noted in FIG. 1, one of the components that utilized by system 100 is a knowledge base component 104. In the illustrated and described embodiment, knowledge base component 104 is implemented, at least in part, utilizing one or more files that are defined in terms of a hierarchical, tag-based language which, in at least some embodiments, can be used to set up cases of text that matches incoming data or text, and define responses that are to be triggered in the event of a case match. In the illustrated and described embodiment, the tag-based language is referred to as "Functional Presence Markup Language" or FPML. Effectively, the FPML files are utilized to encode the knowledge that the system utilizes.

FPML

The discussion provided just below describes aspects of the FPML that are utilized by system 100 to implement various knowledge bases. It is to be appreciated and understood that this description is provided as but one example of how knowledge can be encoded and used by system 100. Accordingly, other techniques and paradigms can be utilized without departing from the spirit and scope of the claimed subject matter.

Preliminarily, FPML is an extensible markup language (XML) that can be utilized to define a surface-level conversational, action-based, or information acquisition program. FPML can be characterized as a stateful expression parser with the expressiveness of a simple programming language. Some of the advantages of FPML include its simplicity insofar as enabling ordinary technical people to capture and embody a collective body of knowledge. Further, FPML promotes extensibility in that deeper semantic forms can be embedded in the surface level engine. In addition, using FPML promotes scalability in that the system can be designed to allow multiple robots to run on a single machine, without significant performance degradation or inordinate memory requirements. That is, preliminarily it should be noted that one application of the technology described in this document utilizes robots, more properly characterized as bots, to provide implementations that can be set up to automatically monitor and/or engage with a particular cyberspace environment such as a chat room or web page. The knowledge bases, through the FPML files, are effectively utilized to encode the knowledge that is utilized by the bots to interact with their environment.

As noted above, FPML allows a user to set up "cases" of language text that match incoming sentences and define responses to be triggered when the case matches. In accordance with various embodiments, cases can be exact string matches, or more commonly partial string matches, and more complicated forms. FPML also supports typed variables that can be used for any purpose, for example, to control which cases are allowed to fire at a given time, thereby establishing a "state" for the program. Typed variables can also be used to set and record information about conversations that take place, as well as configuration settings for one or more robots, as will become apparent below.

In accordance with one embodiment, any suitable types of variables can be supported, e.g. string variables, floating point variables, number variables, array variables, and date variables to name just a few.

As noted above, FPML is a hierarchical tag-based language. The discussion provided just below describes various specific tags, their characteristics and how they can be used to encode knowledge. Each individual tag is discussed under its own associated heading.

fpml tag
The fpml tag is used as follows:

```
<fpml>
...
</fpml>
```

The FPML object is the top level tag for any fpml program. It encloses or encapsulates all other tags found in a document or file. The fpml tag can contain the following tags: <unit>, <rem>, <situation>, <if>, <lexer> and <load>. It should be noted that <rem name="variablename" value="variableValue"> is used to specify initial variables for the XML. When an FPML file is loaded, any <rem> at whose direct parent is <fpml> is evaluated. This mechanism is used to set up initial values for variables and is used often. As an example of the fpml tag, consider the following:

```
<fpml>
    <unit>
        <input>I like dogs</input>
        <response>I like dogs too, <acq name="name"/>!
        </response>
    </unit>
</fpml>
```

This example fpml file has one case, which recognizes the string "I like dogs", and responds with "I like dogs too" followed by the value of the variable "name", which by convention is the name of the user.

load tag
The load tag is used as follows:

```
<load filename="path to file"/>
```

This instruction directs an fpml interpreter to load the fpml file specified by "path to file". This path may be a fully qualified or partial path from FPML file in which the <load> tag appears. The load tag is contained in <fpml>, and does not contain other tags as the tag should be open-closed. As an example of the load tag, consider the following:

```
<!-- Load the fpml program defined in braindead.fpml !-->
<load filename="C:\fpml\braindead.fpml"/>
<load filename="\files\LA010189-0003.fpml"/>
<load filename=".\words.fpml"/>
<load filename="words.fpml"/>
```

The first form loads a file from fully qualified path. The second form loads the file from a subdirectory of the directory in which this file is located. The third loads from the current directory, as does the forth form.

Lexer Tag
The lexer tag is used as follows:

```
<lexer filename="path-to-file"/>
```

This instruction directs the fpml interpreter to load and use the specified .lex file (described above) for breaking up incoming text into word tokens. This is important because even though fpml is a word-based parsing language, there is no absolute definition of what constitutes a word. The lexer program can also categorize words and surface this information to the fpml. This is discussed in more detail below in connection with the <input> tag reference. The lexer tag does not contain other tags and should be open-closed, and is contained in the <fpml> tag. As an example of the lexer tag, consider the following:

```
<load filename="C:\fpml\words.lex"/>
<load filename="\files\words.lex"/>
<load filename=".\words.lex"/>
<load filename="words.lex"/>
```

The first form loads from a fully qualified path. The second form loads from a subdirectory "files" relative to the directory in which the loading file lives. The third and fourth forms load the file located in the same directory in which the loading file lives.

Unit Tag

Use of the unit tag is as follows:

```
<unit>
...
</unit>
```

The unit tag is a "case" in the system whose subtags identify the text that it matches, and the response that should be taken in the presence of a match. The unit tag must contain the following tags: <input> and <response>, and can contain: <prev> and <prev_input>. The unit tag contained in the tags: <fpml>, <if>, <cond> and <situation>.

The <input> tag is used to specify a text pattern to match. The optional <prev> and <prev_input> tags contain expressions that match previous dialog either from the user or from a robot. The <response> tag specifies the output when a match occurs. As an example of how this tag is used, consider the following:

```
<unit>
<input>I like [.]</input>
<response>I like <wild index="1"/>too, <acq name="name"/>!
</response>
</unit>
```

This example fpml file has one case, which recognizes the string "I like [any single word]", and responds with "I like "% incoming-word % too" followed by the value of the variable "name", which by convention is the name of the user.

Input Tag

Use of the input tag is as follows:

```
<input>text-input-expression</input>
```

The text contained within the input tag defines the words and expressions which will trigger the response encapsulated by the <response> tag. This tag contains text and no inner tags are evaluated. The input tag is contained in the unit tag. Using the "text-input-expression", the text contained within the <input> tag can have a special format. It can be characterized as a word-based regular expression. As an example of how this tag can be utilized, consider the following:

```
<input>I like dogs</input>
```

This matches the sentence "I like dogs" and nothing else, from the incoming text. Consider now the following use of this tag:

```
<input>I like +</input>
<input>I like [+]</input>
```

This matches a sentence which begins with "I like" and is followed by one or more words. Additionally, consider the following example:

```
<input>I like *</input>
<input>I like [*]</input>
```

This matches a sentence which begins with "I like" and is followed by zero or more words. It matches both "I like" and "I like you over there". Further, consider the following example:

```
<input>I like [.]</input>
```

This matches a sentence which begins with "I like" and is followed by any single words. For example, it matches "I like you", but not "I like the pickles" or "I like". Thus, the expression [.] matches a single word. Consider the following examples:

```
<input>* I like *</input>
<input>* I like +</input>
<input>+ I like +</input>
<input>* I like [.]</input>
```

As indicated above, input expressions can contain more than one wildcard of any kind anywhere as long as the wildcards are separated by at least one space from the literals.

The input tag can also utilize embedded expressions. Embedded expressions are bracked with '[' and ']'. These bracketed expressions are called queried-wildcards and are used to add expressiveness to the input language. The format of this construct is as follows:

[match-expression from_expression where_expression]

The following examples match expression syntax:

[ANY(word1, word2, word3, ...) from 'wildcard'] (where wildcard is *, +,.

[ANY(word1, word2, ...)] the wildcard '+' is implied

[ANY(w1, w2) AND NOT ANY(w3, w4 ...) from +|*|.]

[VAR(bot_name) from +]

The function ANY(word1, word2, word3, ...) matches any of the specified words, e.g. <input>[ANY(books, magazines, pictures) from +]</input> matches "books", "magazines" and "pictures". The function ALL(word1, word2 ...) matches all of the specified words. The function VAR(variableName) matches the incoming string against a variable name, e.g. <input>[VAR(bot_name) from.] +</input> recognizes the bot name from the beginning of the sentence.

Consider also the function:
REGEX(perl5regularexpression);

```
<input>[REGEX(\$[\d]+(\.[\d]*)?) from +]</input>
```

This function matches money. The regular expression operates on each word subsumed by the star, looking for a match.

Various operators can be utilized within the input tag among which include the NOT, AND, OR, "ANY(w1, w2) AND NOT ANY(w3, w4)", and "VAR(bot_name)" operators.

The operator from_expression can be used and is optional. It specifies the wildcard of the queried-expression from +//one or more from.//exactly one.

If the from-expression is not specified, it is assumed to be the '+' wildcard.

The operator where_expression

The where-expression is used to constrain the match further. Currently this is used to constrain a match to a given lexical token type. For instance if an application is looking for e-mails, it could, create a pattern that accepts only e-mail types, as created by the lexer.

[.WHERE TYPE==EMAIL]

This queried-wildcard expression would match any word whose type is EMAIL.

The lexer, in addition to splitting words and sentences, also produces tokens, which are characterizations of the graphic word. A lexical analyzer can, for example, recognize URLs, IP addresses, Dollars, and the like, as noted above. This information is available to the pattern matcher and can be used to match "types" of data. Consider the following example:

```
<unit>
<input>* [where TYPE==URL] *</input>
<response>URL: <wild index="2"/></response>
</unit>
```

This unit matches any sentence containing a URL. In this example, the response is to simply provide the URL back to the user. A more complicated example can look for a particular URL. As an example, consider the following:

```
<unit>
<input>* [REGEX(spectreai) from . where TYPE==URL] *</input>
<response>URL: <wild index="2"/></response>
</unit>
```

This unit looks for URLs containing the string "spectreai" anywhere in them.

In an implementation example, matching can proceed in a case insensitive way. That is, for a given sentence, all the <unit>'s are given a chance to fire (assuming an <if> or <cond>) does not prevent this. Given this, it is likely that there may be more than one match for a given string. For example:

```
<unit>
<input>*</input>
<response>I don't understand you</response>
</unit>
<unit>
<input>+ what is your name +</input>
<response>My name is <acq name="bot_name"/></response>
</unit>
```

If an incoming sentence is "Hey, what is your name dude?", both of these patterns actually match this string. Desirably, however, one wants the second pattern to evaluate. Given that the matcher is probabilistic, the second match, the one which recognizes the most known text, is chosen. The general idea is that the end-user should not have to worry about this. Picking the best match is the responsibility of the fpml interpreter. In the event of identical patterns, or identical probabilistic matches, the match that is loaded last wins. Consider the following example:

```
<unit>
<input>+ what is your name +</input>
<response>My name is <acq name="bot_name"/></response>
</unit>
<unit>
<input>+ what is your name +</input>
<response>Who cares!<response/>
</unit>
```

They both match the same text with the same probability. However, as the second match was the last loaded, the second will fire.

Prev Tag

Use of this tag is as follows:

```
<prev>text-input-expression</prev>
```

The <prev> element is part of the <unit> tag and declares a constraint on the matcher. In order for a sentence to match this unit, the <prev>"text-input-expression"</prev> must also match what the robot said previously. That is, the unit will match ONLY if what the robot said prior to the current input can match against "text-input-expression".

The format for text-input-expression is identical to the format of data in the <input> tag, thus attention is directed to the input tag for details on syntax. The prev tag has an optional index attribute which specifies how many places back to go in a robot's conversation history to find a match. The default value is one. This means that the last sentence the robot said must match against the text-input-expression in order for the <unit> to match. If the index attribute is less than zero, e.g. <prev index="-5">*yes*</prev_input>, then all of the past five sentences of the robot history will be matched. If any are matched, the unit will be allowed to match the <input> tag.

Consider the following FPML example of a conversation relating to going to a movie.

```
<unit>
<input>yes</input>
<prev index="1">* go to a movie *</prev>
```

-continued

```
<response>which one?</response>
</input>
<unit>
<input>* matrix *<input>
<prev>which one</prev>
<response>The Matrix it is. When?</response>
</unit>
<unit>
<input>*</input>
<prev>* the matrix it is * when *</prev>
<response>Sounds good</response>
</unit>
```

Example dialog:

robot> do you want to go to a movie?

user>yes robot> which one?

user>I like the matrix robot>The matrix it is. when?

user>11:30 robot>Sounds good.

Prev Input Tag

Use of the prev_input tab is as follows:

<prev_input index="1">text-input-expression</prev_input>

The <prev_input> element is part of the <unit> tag and declares a constraint on the matcher. In order for a sentence to match this unit, the "text-input-expression" must also match what the user said previously. That is, the unit will match ONLY if what the user said prior to the current input can match against "text-input-expression".

The format for text-input-expression is identical to the format of data in the <input> tag. Thus, the reader is referred to the discussion of the input tag for 8 details on syntax.

The prev_input tag has an optional index attribute which specifies how many places back to go in the user's history to find a match. The default value is one, which means that the last sentence the user said must match against the text-input-expression in order for the <unit> to match.

If the index attribute is less than zero, e.g. <prev_input index="−5">*yes *</prev_input>, then all of the past five sentences of the user history will be matched. If any are matched, the unit will be allowed to match the <input> tag.

This tag contains text—expression just like the input expression and is contained in: <unit>.

Response Tag

Use of the response tag is as follows:

```
<response>
</response>
```

The response tag holds elements that will evaluate when the <input> (and <prev . . . >) generate the best match for a given sentence. In some embodiments, the response tag defines what the robot will say or record. This tag is contained in: <unit> and can contain: text, as well as the following tags: <cond>, <rand>, <op>, <if>, <acq>, <rem>, <cap>, <hearsay>, <impasse>, <lc>, <uc>, <sentence>, <swap_pers>, <swap_pers1>, <rwild>, <wild>, <recurs>, and <quiet>.

If Tag

Use of this tag is as follows:

```
<if name="variableName" value=="text-input-expression">
fpml-tags
</if>
<if expr="script-expression">
</if>
```

The if tag is used to control execution flow. If the specified variable can be evaluated against the value, the contained nodes are turned on. If not, the contained nodes are not executed. Variables and the <if> expression allow the FPML programs to run in a stateful way. This tag can contain the following tags: <unit>, <if>, and <situation>, and all tags the response tag can contain. This tag is contained in the following tags: <fpml>, <response>, all tags the response tag can contain, <if> and <situation>. The if tag can be used as an intra-unit tag to control program flow. As example, consider the following:

```
<if name="name" value="* tommy *">
<unit>
<input>* HI *</input>
<response>It has been a long time. still working on the documentation</response>
</unit>
<unit>
...
</unit>
</if>
```

In this situation, the units contained within the <if> statement will only be evaluated if the user name "name" is something with "tommy" in it. Although this is an elementary example, this shows how to use arbitrary variables to control program flow.

The value=". . . " attribute of the <if> tag can be any expression that is valid in the <input> text. It can also be "?". When value is '?', the conditional evaluates to true if the variable is set and is false otherwise. This construct can be used in <if>, <cond>, and <situation>. Alternatively, the <if> tag can use "expr=" instead of name and value pairs. This allows code expressions to be used to perform the test. Additionally, the <if> tag can be used to control program flow in the <response> tag. As an example, consider the following:

```
<unit>
<input>*</input>
<response>
Hello there.
<if name="vTalkative" value="true">
Goodness, my. It is a lovely day. I wonder where the other people are. I love to chat.
</if>
How are you?
</response>
</unit>
```

Another silly example, if vTalkative is set to "true", then the text underneath the if statement will be added to the response string.

Situation Tag
Use of this tag is as follows:

```
<situation name="input-text-expression">
```

The situation tag is another program control tag and is used to control which units get precedence over all other units. It is useful in managing discourse. However, it is not used in the <response> tag. This tag can contain the following tags: <unit> and <if>, and can be contained in: <fpml> and <if>.

As an example, consider the situation "computers" below:

```
<unit>
    <input>* Computers *</input>
    <response>Lets talk about computers. <quiet><rem name="situation">computers</rem><quiet/>
    </unit>
<situation name="* computers *"/>
<unit>
    <input>[ANY(buy, purchase, lease, rent)]</input>
    <response>I've had success with Dell. Can go to dell online at www.dell.com</response>
</unit>
<unit>
    <input>[crash, crashed, crashing, bomb)]</input>
    <response>Which operating system are you running?</response>
</unit>
<unit>
    <input>* XP *</input>
    <prev_input>[crash, crashed, crashing, bomb)]</prev_input>
    <response>which program?</response>
</unit>
...
<unit>
    <input>*</input>
    <response>We were talking about computers. would you like to talk about something else?
    </response>
</unit>
</situation>
```

The situation tag provides a way to encapsulate a particular subject and protect it somewhat from outside <unit>. It's probabilistic <input> *<input> in the above situation only if no other <unit>s in the global space produce a better match.

In the above example, <situation name="* computers *" is syntactically equivalent to this IF statement:

```
<if name="situation" value="* computers *">.
```

Response Tags

As noted above, tags within the <response> generate output or record information. With a couple of exceptions, such as <cond>, every valid response tag can contain all other tags located within the response.

Rand Tag
Use of this tag is as follows:

```
<rand>
    <op> response-expression(1)</op>
    <op> response-expression(2)</op>
    <op> response-expression(3)</op>
</rand>
```

The rand tag picks one of it's sub-elements at random and uses it to generate the response. This tag is contained in <response> and contains <op>. As an example of this tag's use, consider the following:

```
<unit>
<input>HI + </input>
<response>
<rand>
<op>Hello <acq name="name"/>!!!</op>
<op>Hidy ho!</op>
<op>Cheers!</op>
</rand>
<rwild/>
</response>
</input>
```

Cond Tag
Use of this tag is as follows:

```
<cond>
```

The cond tag allows for conditional evaluation inside the <response> tag. It is a complicated form and has three levels of expressivity. The first level of expressivity is where it is identical to the <if> tag and can assume the same places and locations. For example,

```
<cond name="variableName" value="text-input-expression>
<cond expr="script-expression">.
```

The second level of expressivity is where the cond tag identifies the variable name, but not the variable value. In this case, the cond tag should contain only <op> tags. Each op tag will define the value field. The <op> which matches best is chosen for the evaluation. As an example, consider the following:

```
<unit>
<input>SERVICECONNECTED</input>
<response>
<cond name="bot_name">
    <op value="ScoobyDruid" >
        /nickserv identify oicu812
        <impasse>!MASTER \0304I took care of the privacy and the identity for you sir
        </impasse>
    </op>
    <op value="MonkeyKnuckles" >
        /nickserv identify oicu812<impasse>!DELAY 1</impasse><impasse>!MASTER \0304I took
        care of the privacy and the identity for you sir.</impasse>
    </op>
    <op><impasse>!MASTER \0304This nick is not registered</impasse>
    </op>
</cond>
</response>
</unit>
```

In the third level of expressivity, <cond> has no attributes, and each <op> field will have both a "name" and "value" attribute. As an example, consider the following:

```
<unit>
<input>SERVICECONNECTED</input>
<response>
<cond>
   <op name="bot_name" value="ScoobyDruid" >
      /nickserv identify oicu812
         <impasse>!MASTER \0304I took care of the privacy and the
identity for you sir
         </impasse>
   </op>
   <op name="bot_name" value="MonkeyKnuckles" >
      /nickserv   identify   oicu812<impasse>!DELAY
1</impasse><impasse>!MASTER \0304I took
         care of the privacy and the identity for you sir.</impasse>
   </op>
   <op><impasse>!MASTER   \0304This   nick   is   not
registered</impasse>
   </op>
</cond>
</response>
</unit>
```

Note that both forms have exactly the same behavior. There can also be default behavior for <cond> case expressions. Consider the example just below.

If the variable "name" does not exist (via "?" construct), nothing is output. The default case is the last <op> tag without any expression. This will always evaluate, but only if nothing above it is fired.

```
<unit>
<input>* HI *</input>
<response> Hello
<cond name="name"/>
<op value="?"></op>
<op>, <acq name="name"/></op>
</cond>
.
</response>
</unit>
```

Op Tag
Use of the op tag is as follows:

```
<op>fpml-response</op>
<op value="variableValue">fpml-response</op>
<op name="variableName" value="variableValue">fpml-response</op>
```

This tag is used to express a conditional or random "case" for output. See, e.g. <cond> and <rand> for usage. This tag contains text and any valid response tag, and is contained in <cond> and <rand>.

Rem Tag
Use of this tag is as follows:

```
<rem name="varName" value="varValue"/>
<rem expr="script-expression">
<rem name="varName">The Variable Value</rem>
```

This tag is used to set a variable to a specified value. The names and values are arbitrary and can be any value. This tag can contain text and any tag which is valid within the <response> tag, and is contained in <fpml> (for variable initialization) and <response> (for setting new variables). As an example of this tag's usage, consider the following:

```
<fpml>
<rem name="bot_name" value="Mr. Z"/>
<rem name="bot_favorite_color" value="purple"/>
...
```

When the fpml loads, these variables are initialized to these values. Additionally consider the following example:

```
<unit>
<input>Let * talk about the +</input>
<response>
   Sounds   great.   <quiet><rem   name="situation"><wild
index="2"/></rem></quiet>
   Do you have strong feelings about <wild index="2"/>?
</response>
</unit>
```

Within the unit tag, this sets the "situation" to the wildcard, and asks a general question.

Acg Tag
Use of this tag is as follows:

```
<acq name="variableName"/>
```

This tag is used to retrieve a variable value and contains no other tags. This tag is contained in <response> or any valid response tag except <cond> and <rand>. As an example of this tag's use, consider the following:

```
<unit>
<input>* HI *</input>
<response>Well hello, <acq name="name"/></response>
</unit>
```

Quiet Tag
Use of this tag is as follows:

```
<quite>
```

This tag is used to evaluate inner tags but to nullify the response these tags to generate. This tag contains any valid tag within the <response>, and is contained in <response> and any valid tag within the <response>. As an example of this tag's use, consider the following:

```
<unit>
<input>* computers *</input>
<response>
   I   am   a   computer.   <quiet><rem
name="situation">computers</rem></quiet>
</response>
</unit>
```

Without the quiet tag, the text "computers" would be added to the response.
With the quiet tag, it is not.
Wild Tag
Use of this tag is as follows:

```
<wild/>
<wild index="1 based wildcard index"/>
```

This tag is used to retrieve the value of the wildcards that are unified in the <input> expression. This tag contains no tags and is contained in <response> or any valid response tags. As an example of this tag's use, consider the following:

```
<unit>
<input>* I like *</input>
<response><recurs><wild index="1"/></recurs>. I like <wild index="2"/>
</response>
</unit>
```

Rwild Tag
Use of this tag is as follows:

```
<rwild/>
<rwild index="1 based wildcard index"/>
```

The engine supports recursion of responses. There are two recursion tags <recurs> and <rwild>. These tags submit their evaluations back into the engine for response. This filtering mechanism allows language syntax to be reduced iteratively. <rwild> instruction is used to recurse on the first wildcard, and <rwild index="2"/> is used to recurse on the second wildcard. This tag contains no other tags and is contained in <response> or any response sub element. As an example of this tag's use, consider the following:

```
<unit>
<input>THE *</input>
<response><rwild/></response>
</unit>
```

This generic pattern will be matched only if no other better match is found. In this case, the determiner is stripped off and the text is resubmitted for evaluation with the hope that the engine will better recognize the entity without the determiner.
Recurs Tag
Use of this tag is as follows:

```
<recurs>fpml-response</recurse>
```

As noted above, the engine supports recursion of responses and this is the other of two recursion tags. These tags submit their evaluations back into the engine for response. This filtering mechanism allows syntax to be scraped iteratively. The <recurs> instruction, unlike <rwild>, can contain elements. These elements are evaluated and the resulting text is resubmitted as input to the fpml interpreter. As an example of this tag's use, consider the following:

```
<unit>
<input>DO YOU KNOW WHO * IS</input>
<response><recurs>WHO IS <wild/></recurs></response>
</unit>
```

This example takes a more complex grammatical form and reduces it to a more generic form. Consider the synonym rewrite as follows:

```
<unit>
<input>HI THERE</input>
<response><recurs>HELLO1</recurs>
</response>
</unit>
<unit>
<input>Aloha</input>
<response><recurs>HELLO1</recurs>
</response>
</unit>
<unit>
<input>HIYA</input>
<response><recurs>HELLO1</recurs>
</response>
</unit>
..
```

This example allows for a complicated hello response, without having to duplicate the response expression across a variety of units.
Impasse Tag
Use of the impasse tag is as follows:

```
<impasse>
```

This tag in the <response> element forces a callout to the calling application with the evaluation text of its inner elements. This is used to communicate information to the outer application. This tag is contained in <response> or any response sub element, and contains text or any response sub element. A command structure can be utilized that uses the impasse tag to trigger application specific operations.
Cap Tag
This tag capitalizes the first letter of the output of all its contained elements or text and is contained in any response tag, and contains any response tag/text. As an example of its use, consider the following:

```
<cap>united states</cap>
output: United States
```

<lc><uc> Tags
These tags make the output of the contained elements all lower case <lc> or upper case <uc>.
<sentence> Tag
This <response> tag will convert the contained text and elements into a sentence form.
<swap_pers> Tag
This tag transforms inner elements from first person into second person.

<swap_pers1 > Tag

This tag transforms inner elements and text from second person to third person.

Script Expressions

In accordance with one embodiment, the FPML runtime (discussed in more detail below) can support assignment and conditional testing expressions. The syntax is ECMAScript, but it does not include the ability to have control statements, or functions.

Script expressions are added to fpml through the expr="script expression" attribute. This attribute is valid in the following tags: <if>, <cond>, <op>, <rem> and <acq>. As an example of this tag's use, consider the following:

```
<if expr="(var1 == 1 && var2 == 2.0)">
<if expr="myVar == myVar1 + 1 && profile[key_name] == 'george'/>
<rem expr="key_name = 0; profile_array[key_name] = 'Mark'; />
```

If one wishes to add more than one assignment expression in a single "expr" attribute, this is possible, by separating the expression statements with a semicolon ';'. This is useful for creating <rem> expressions which initialize a whole bunch of variables. If the rem expression is in the top level of the file, it will be evaluated when the FPML is instantiated in, for example, a bot. As an example, consider the following:

```
<fpml>
<rem expr="
likes_cooking = 0;
likes_eating = 1;
likes_gasgrill = 2;
profile[likes_cooking] = 0.0;
profile[likes_eating] = 0.5;
profile[likes_gasgrill]=1.0;
"
/>
</fmpl>
```

In this case, the <rem> expression will be evaluated on bot startup, and all those variables initialized to these values.

Variables are loosely typed and can transform to new types without explicit operators. New variables can be created on the fly and are case sensitive. For example, "Var1" is not the same as "var1". Numbers are created simply by assigning a numeric value to a variable, e.g. Var1=1, Var1=1.23445 and the like. Strings are created by using the ' ' single quote, e.g. Var1='Mark'. Arrays are created simply by indexing a variable. If the variable exists, it will be retyped as an array; if the index is greater than the size of the array (initially 0 length), the array will grow dynamically, e.g. profile[0]=0.95; profile[1]=0.50; profile[2]=0.25; likes_food=0; likes_beach=1; likes_coffee=2; profile[likes_food]=0.95; profile[likes_beach]=0.50; profile[likes_coffee]=0.25; profile[likes_coffee+1]='mark'.

Arrays indices are full fledged variables and can loosely be types. Index[0] can be a string, while Index[1] can be floating point, Index[2] can be another array, and the like. The expression system does not impose a limit on the dimension of the array, e.g. Array[0][1][0][0]='true' is valid.

In one embodiment, the following operators grouping tags are supported by the expression evaluator. Precedence rules of EMCAScript have been adopted.

= assignment operator
== comparison operator
!= comparison operator
( ) grouping operator
> greater than
< less than
>= gte
<= lte
&& Logical AND
|| Logical or
[ ] Array index
'xx' const string—v='mark'
{ . . . , . . . } constant array—v={0,1,2,3,4,5};
! logical not
+ add operator
− subtract operator
* multiply operator
/ divide operator The following keywords are currently defined for the language: true, false.

Probabilistic Expression Matching

Having now considered the above discussion of the functional presence engine and the knowledge bases, consider the following. As can surely be appreciated, FPML, at a basic level, can be used to define a list of regular expressions which trigger a response when incoming data is matched against the expression. It is desirable that the matching process be as smart as possible insofar as its ability to handle collisions. A collision occurs when incoming text matches two or more FPML units. To address the issue of collisions and in accordance with one embodiment, a statistical or probabilistic methodology is utilized. For example, in accordance with this embodiment, instead of returning Boolean values, the process can return a probabilistic score that identifies how close the input text is matches to the particular knowledge base unit. If the scoring methodology is sound, then unit interdependence is much less of an issue and the highest ranking FPML unit which matches the incoming text is also guaranteed to be the most semantically relevant to the text and thus captures the most information of all competing knowledge base units.

As noted above, more than one <unit> may unify successfully against incoming text. This is expected and in some instances desirable. The FPML Runtime (discussed in more detail below), uses a probabilistic methodology to choose the best unification among competing units. The best unification, in accordance with one embodiment, is the unification that provides the best semantic coverage for the incoming text. This is achieved, in this embodiment, by scoring exact graphic word matches at a high value and scoring wildcard matches lower. As an example, consider the following FPML:

```
<!-input 1 !-->
<input>OSAMA IS EVIL</input>
...
<!-input 2 !-->
<input>* OSAMA * </input>
<!-input 3 !-->
<input>OSAMA IS *</input>
```

Given the string "OSAMA IS EVIL", more semantic information is uncovered by selecting input 1 as the best unification. Given the string "OSAMA IS MOVING", more semantic information is uncovered by selecting input 2. Semantic context is garnered when graphic words in the <input> match graphic words in the incoming text. The more graphic words which match exactly, the more semantic information is uncovered. Thus, a generalization is that for any incoming text, one wants to match it to an input which uncovers the most graphic words either directly or through a functional process.

Consider the following mathematical approach. Each <input> expression E is represented by $(e_1 \ldots e_k)$ terms, where each term can be either a graphic word, a wildcard type, or an embedded functional expression, and k is the total number of terms. Given this, consider the following table which separates four expressions into their component terms:

| OSAMA is evil | OSAMA is a* | *OSAMA* | [ANY(OSAMA, USAMA) from+] |
|---|---|---|---|
| e1 = osama | e1 = osama | e1 = KSTAR | e1 = STAR + Fn(ANY(OSAMA, USAMA)) |
| e2 = is | e2 = is | e2 = osama | |
| e3 = evil | e3 = a | e3 = KSTAR | |
| | e4 = KSTAR | | |

Each incoming sentence S is split into words $(w_1 \ldots w_n)$, where each word represents a graphic word as defined by the lexical analyzer and n is the total number of words in the sentence. Thus, "Osama is a evil man" breaks down as follows:

$w_1$=Osama
$w_2$=is
$w_3$=a
$w_4$=evil
$w_5$=man

The unifier takes an <E,S> and attempts to create a resultant list R of size k where $r_i$ is a list of words subsumed by $e_i$. If such a set R can be produced, S can be said to unify against E. The incoming text "Osama is moving out" unifies against three of the 4 specified inputs as follows:

| OSAMA *moving* | *OSAMA* | [ANY(OSAMA, USAMA) from +] |
|---|---|---|
| $r_1$ = osama | $r_1$ = Ø | $r_1$ = STAR + Fn(ANY(OSAMA)) |
| $r_2$ = is | $r_2$ = osama | $R_1$ = Osama is moving out |
| $R_3$ = moving | $r_3$ = is moving out | |
| $R_4$ = out | | |

In this example, the FPML engine needs to make a decision about which is the best unification. It is easy to observe that "OSAMA *moving*" would be the <input> which uncovers the greatest semantic context. Thus, this is the preferred unification. Using R, a probability is calculated by assigning a score to each $R_i$ and then summing them and dividing by the number of words in the input (n)+the number of KLEENSTAR matches which unify against nothing.

In accordance with one embodiment, there are two methods that can be utilized for assigning scores. This first method is an ad-hoc method that works well in the absence of word statistics. As an example, consider the following:

Score$_i$=
If $E_i$ is a graphic word type, the score for $r_i$ is 0.95.
If $E_i$ is a MATCHONE wildcard type, the score is 0.7.
If $E_i$ is a STAR (one or more), the score is 0.55 times the number of words in $r_i$.
If $E_i$ is a KLEENSTAR, the score is 0.45 times the number of words in $r_i$.
If $E_i$ is a functional type, the score is dependent on the function. This value is usually calculated by adding high scores for terms that match the function, and low scores for extra terms.

The second method can utilize term weights, such as inverse document frequency. Here, the graphic words can be assigned scores based on the semantic information returned by the word and do not need to be a constant. As an example, consider the following.

Count$_i$=
If $E_i$ is a graphic word or MATCHONE, 1.
If $E_i$ is KLEENSTAR, number of terms captured by the wildcard.
If $E_i$ is KLEENSTAR and number of terms is greater than 0, number of terms captured by the wildcard.
If $E_i$ is KLEENSTAR and the number of terms is 0, 1.
The score is thus computed as follows:

$$Prob(E|S) = \frac{\sum_{i=1}^{i<=k} Score(r_i)}{\sum_{i=1}^{i<=k} Count(r_i)}$$

$$Prob(E|S) = \sum_{i=1}^{i<=k} Score(r_i)$$

The first equation is the normalized approach. In this methodology, scores from different inputs can be compared to each other in a meaningful way.

In many applications, relative comparisons among different inputs is not necessary, and there are some consequences of the normalization methods related to matching. Hence, the second equation constitutes an unnormalized variant, to remove these side effects.

Using the above scoring equation, the scores are calculated as follows:
OSAMA *moving*
Osama is moving out
(0.95 0.45 0.95 0.45)/(1+1+1+1)=0.7
*OSAMA*
Osama is moving out
(0.95 0.45 0.45 0.45)/(1+1+3)=0.46
[ANY(OSAMA, USAMA) from +]
Osama is moving out
(0.95 0.55 0.55 0.55)/(4)=0.65

It is also reasonable to remove the normalization step from the equation. In this case, generated scores will be significantly higher, and reflect precisely the amount of data that has been unified, regardless of the size of the source string. The advantage is that matches will generate larger numbers. The disadvantage is that scores from generated by an input pattern pair can only be reasonably compared with the results of unification from other patterns using the same input. Comparing results from unifications of different inputs is not possible when normalization is turned off.

Exemplary Software Architecture

The following discussion describes an exemplary software architecture that can implement the systems and methods described above. It is to be appreciated that the following discussion provides but one example and is not intended to limit application of the claimed subject matter. Accordingly, other architectures can be utilized without departing from the spirit and scope of the claimed subject matter.

Figure 3:
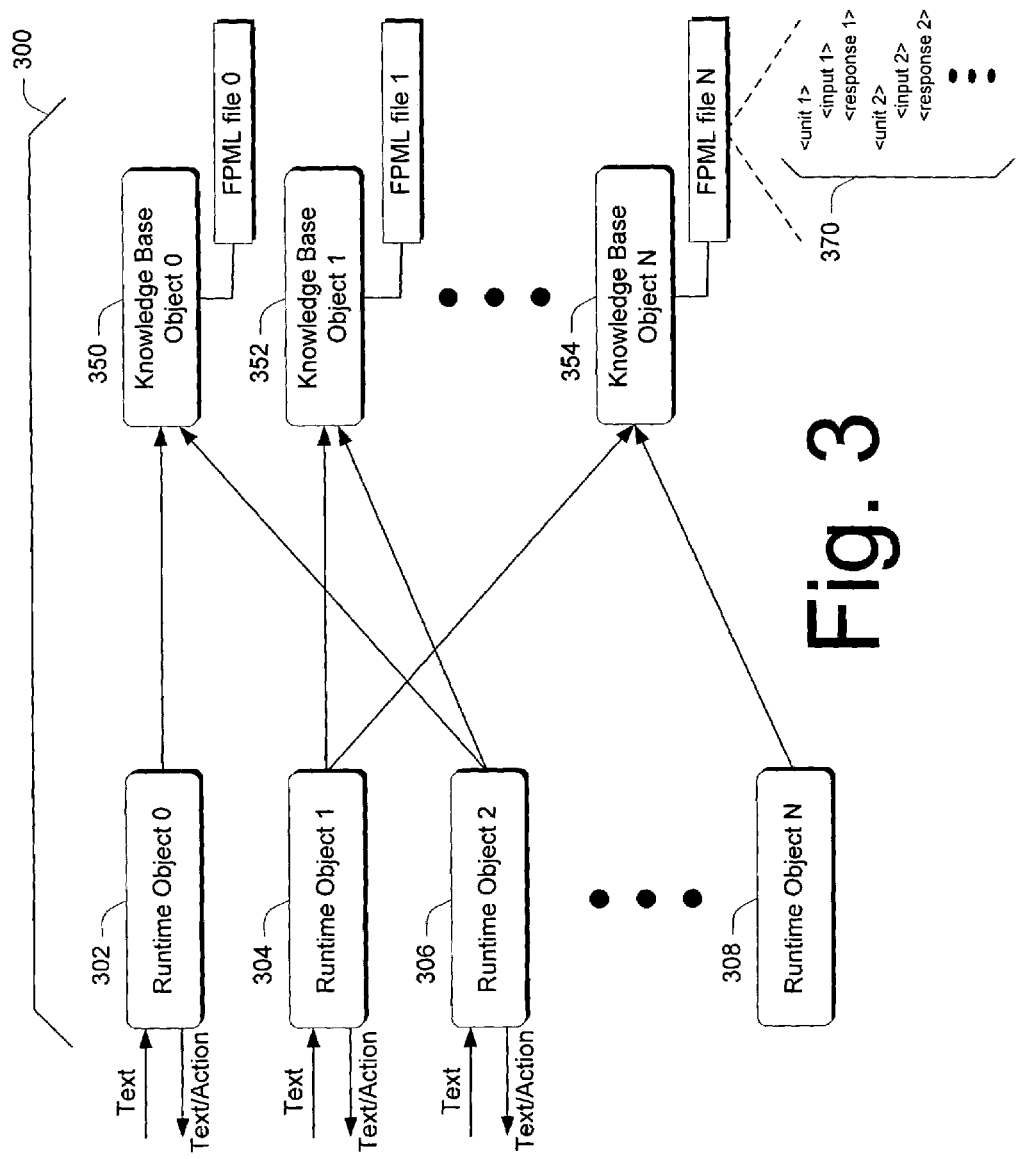
FIG. 3 is a block diagram that illustrates software components in a system in accordance with one embodiment.

FIG. 3 shows an exemplary system generally at 300 comprising one or more runtime objects 302, 304, 306 and 308 and one or more knowledge base objects 350, 352 and 354.

In the illustrated and described embodiment, the runtime objects are software objects that have an interface that receives data in the form of text and produces text or actions.

In one embodiment, the runtime objects are implemented as C++ objects. Knowledge base objects 350-354 are software objects that load and execute FPML knowledge bases and handle user requests. Together, the runtime objects and the knowledge base objects cooperate to implement the functionality described above.

More specifically, in the illustrated and described embodiment, each knowledge base object is associated with a single FPML file. Examples of FPML files are described above. The knowledge base object is configured to load and execute, in a programmatic manner, the FPML file. In some embodiments, FPML files can be nested and can contain links to other objects. This allows one broader knowledge base to include individual FPML files. This keeps the knowledge organized and makes it easier to edit domain specific knowledge. In the present example, runtime objects can point to or otherwise refer to more than one knowledge base object, thus utilizing the functionality of more than one knowledge base object. Similarly, knowledge base objects can be shared by more than one runtime object. This promotes economies, scalability and use in environments in which it is desirable to receive and process text from many different sources.

In the illustrated and described embodiment, the runtime objects contain state information associated with the text that it receives. For example, if the text is received in the form of a conversation in a chat room, the runtime object maintains state information associated with the dialog and discourse. The runtime objects can also maintain state information associated with the FPML that is utilized by the various knowledge base objects. This promotes sharing of the knowledge base objects among the different runtime objects.

As an overview to the processing that takes place using system 300, consider the following. In the present example, the runtime objects receive text and then utilize the knowledge base objects to process the text using the FPML file associated with the particular knowledge base object. Each of the runtime objects can be employed in a different context, while utilizing the same knowledge base objects as other runtime objects.

Now specifically consider knowledge base object 354 which is associated with a loaded FPML file N. As described above, the FPML file comprises a hierarchical tree structure that has <unit> nodes that encapsulate <input> nodes and <response> nodes. Each of these nodes (and others) is described above. When a runtime object receives text, it passes the text to one or more of the knowledge base objects. In this particular example, runtime objects 304 and 308 point to knowledge base object 354. Thus, each of these runtime objects passes its text to knowledge base object 354. As noted above, each knowledge base object, through its associated FPML file, can be associated with a particular lexer that performs the lexical analysis described above. When the knowledge base object receives text from the runtime object(s), it lexically analyzes the text using its associated lexer.

As noted above, because each runtime object can point to more than one knowledge base object, and because each knowledge base object can specify a different lexer, the same text that is received by a runtime object can be processed differently by different knowledge base objects.

Consider now the process flow when text is received by a runtime object. When the runtime object receives its text, it makes a method call on one or more of the knowledge base objects and provides the text, through the method call, to the knowledge base object or objects. The process now loops through each of the knowledge base objects (if there is more than one), looking for a match. If there is a match, the method returns a score and an associated node that generated the score, to the runtime object. In the present example, assume that the FPML associated with knowledge base object 354 processes the text provided to it by runtime object 308 and, as a result, generates a match and score for the <input 2> node of <unit 2>. The score and an indication of the matching node are thus returned to the runtime object and can be maintained as part of the state that the runtime object maintains. In the event that there are multiple matches, a best match can be calculated as described above. Once the runtime object has completed the process of looping through the knowledge base objects, and, in this example, ascertained a best match, it can then call a method on the matching node to implement the associated response. Note that in the presently-described embodiment, for each <input> node there is an associated <response> node that defines a response for the associated input. Exemplary responses are described above. Thus, when the runtime object calls the knowledge base object and receives a particular response, the runtime object can then call an associated application and forward the response to the application.

Exemplary System Utilizing Runtime and Knowledge Base Objects

Figure 4:
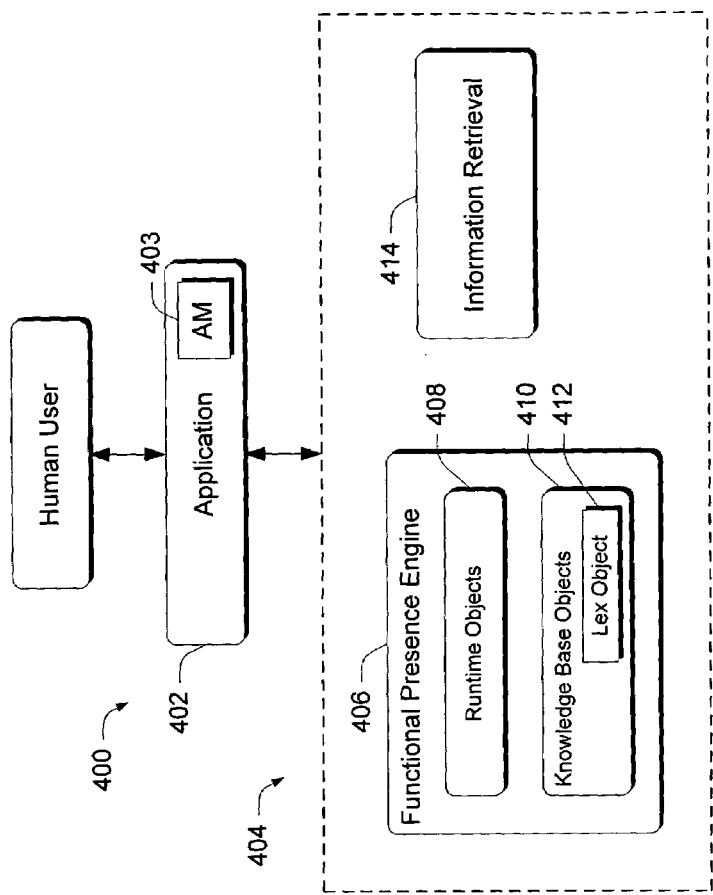
FIG. 4 is a block diagram that illustrates a system in accordance with one embodiment.

FIG. 4 shows an arrangement of components that utilize the above-described runtime and knowledge base objects in accordance with one embodiment, generally at 400. In this system, one or more human users or monitors can interact with an application 402 which, in turn, interacts with a functional presence system 404. In accordance with one embodiment, the application can comprise an agent manager component 403, which is discussed in greater detail below in the section entitled "Implementation Example Using Dynamic Agent Server".

In accordance with the presently described embodiment, functional presence system 404 comprises a functional presence engine 406 which itself comprises one or more runtime objects 408 and one or more knowledge base objects 410. Each knowledge base object can have an associated lex object 412 that is configured to perform lexical analysis as described above. The functionality of the runtime and knowledge base objects is discussed above and, for the sake of brevity, is not repeated here.

In addition, system 404 can comprise an information retrieval component 414 which is described in more detail just below.

Information Retrieval

In accordance with one embodiment, information retrieval component 414 utilizes the services of the functional presence engine 406 to process large numbers of documents and perform searches on the documents in a highly efficient manner.

Before, however, describing the information retrieval process, a little background is given so that the reader can appreciate the inventive processes. One way to perform searches on documents is to perform a so-called linear or serial search. For example, assume that, given 4 Gigabytes of data, an individual wishes to search for a particular term that might be contained within the data. By performing a linear or serial search, a search would proceed linearly—byte by byte—until the term was or was not found. Needless to say, a linear search can take a long time and can be needlessly inefficient.

In accordance with the described embodiment, the information retrieval component creates and utilizes a table whose individual entries point to individual documents. Entries in the table are formed utilizing the services of the functional presence engine.

Figure 5:
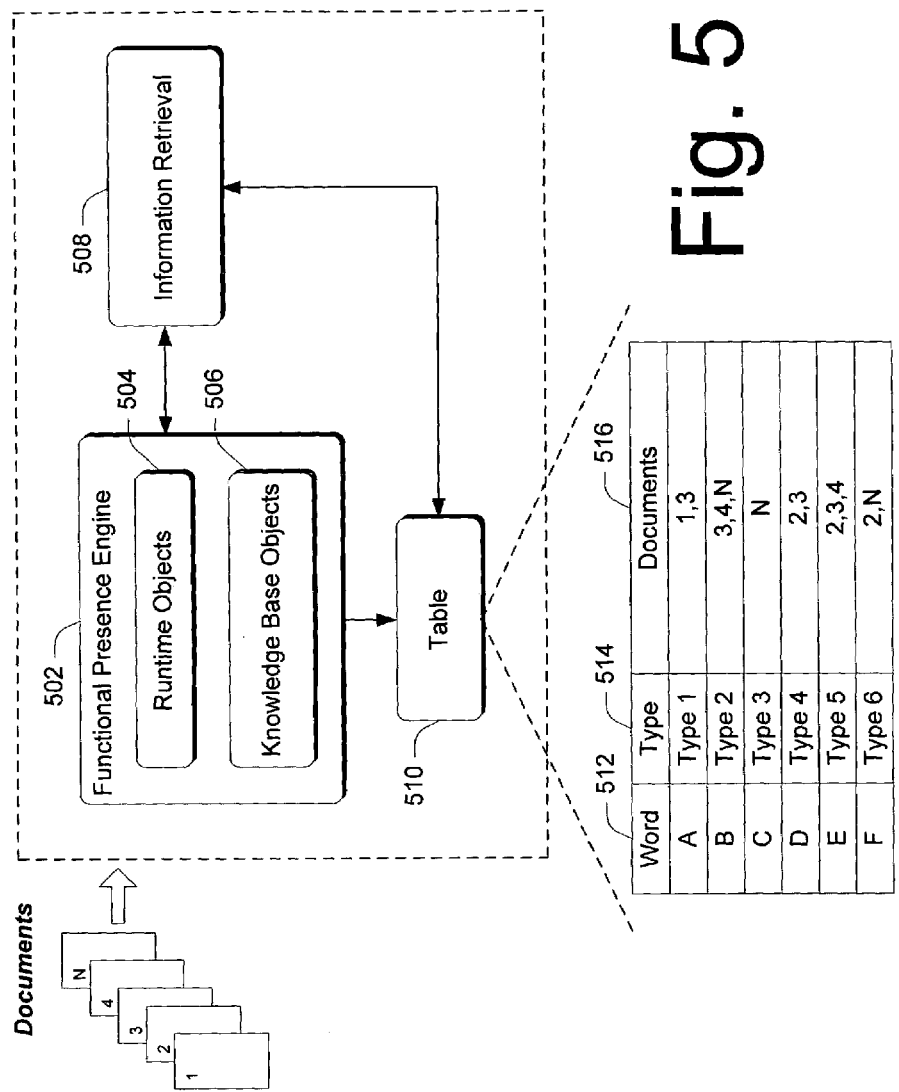
FIG. 5 is a block diagram that illustrates a system in accordance with one embodiment.

As an example, consider FIG. 5 which shows a system generally at 500 that comprises a functional presence engine that utilizes one or more runtime objects 504 and one or more knowledge base objects 506. An information retrieval component 508 utilizes functional presence engine 502 to create and use a table 510 which is shown in expanded form just beneath system 500.

In accordance with one embodiment, functional presence engine 502 receives and processes data which, in this example, comprises a large number of documents. The documents, under the influence of the functional presence engine and its constituent components, undergoes lexical analysis and tokenization (typing) as described above. As these processes were described above in detail, they are not described again. The output of the tokenization or typing process is one or more tables.

Specifically, in the present example, table 510, shown in expanded form, includes a column 512 that holds a value associated with a particular word found in the documents, a column 514 that holds a value associated with the type assigned to the word in the tokenization process, and a column 516 that holds one or more values associated with the documents in which the word (type) appear. Thus, in this example, each row defines a word, an associated type and the document(s) in which the word or type appears. So, for example, word A is assigned type 1 and appears in documents 1 and 3.

In the illustrated and described embodiment, the typing of the data removes any need to do a key word search. Instead, one can search for various types and can specify, through the information retrieval component 508, a regular expression to be used to search the various types. For example, one might specify a search for all documents that contain an email address that contains a certain specific term. A search on the type "Email addresses" identifies all of the email addresses from column 514. A regular expression search of column 512 can then identify all of the matches whose associated documents are indicated in column 516.

Although this is a simple example, as the skilled artisan will surely appreciate, what begins to emerge is a system that allows for structured types of operations to be performed on unstructured data.

In the illustrated and described embodiment, the information retrieval process is passive in that it is provided with information and then processes the information, along with the functional presence engine to provide a robust searching and retrieval tool. In this particular example, the information retrieval component is not responsible for seeking out and acquiring the information that it searches.

Exemplary Method

Figure 5A:
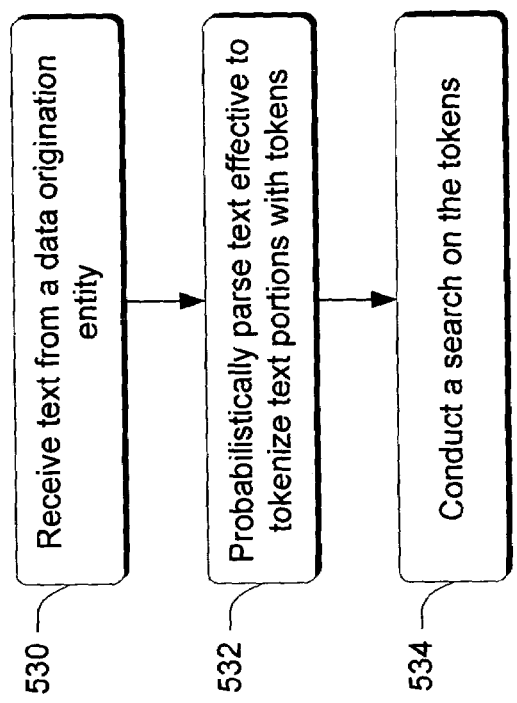
FIG. 5a is a block diagram that illustrates steps in a method in accordance with one embodiment.

FIG. 5a illustrates steps in a method in accordance with one embodiment. The method can be implemented in connection with any suitable hardware, software, firmware or combination thereof. In one embodiment, the method can be implemented in connection with systems such as those shown and described in FIGS. 1-5. Step 530 receives text from a data origination entity. A data origination entity, as used in this document, is intended to describe an entity from which data is obtained. For example, in the context of the Internet, a data origination entity can comprise a server, a server-accessible data store, a web page and the like. In the context of a company intranet, a data origination entity can comprise a network-accessible data store, a server, a desktop computer and the like.

Step 532 probabilistically parses the text effective to tokenize text portions with tokens. In the illustrated and described embodiment, probabilistic parsing is accomplished using one or more matching rules that are defined as regular expressions in an attempt to match to text received from the data origination entity. Examples of how probabilistic parsing can take place are described above. Hence, for the sake of brevity, such examples are not repeated here. Step 534 conducts a search on the tokens. Examples of how and why searches can be conducted are given above and, for the sake of brevity, are not repeated here.

Implementation Example Using Dynamic Agent Server

In accordance with one embodiment, the above-described systems and methods can be employed in the context of a system referred to as the "dynamic agent server." The dynamic agent server is a client-server platform and application interface for managing and deploying software agents across networks and over the Internet. The dynamic agent server is enabled by the functional presence engine and, in particular, the runtime objects that are created by the functional presence engine. The dynamic agent server can be configured to incorporate and use various applications and protocols, ingest multiple textural data types, and write to files or databases.

Figure 6:
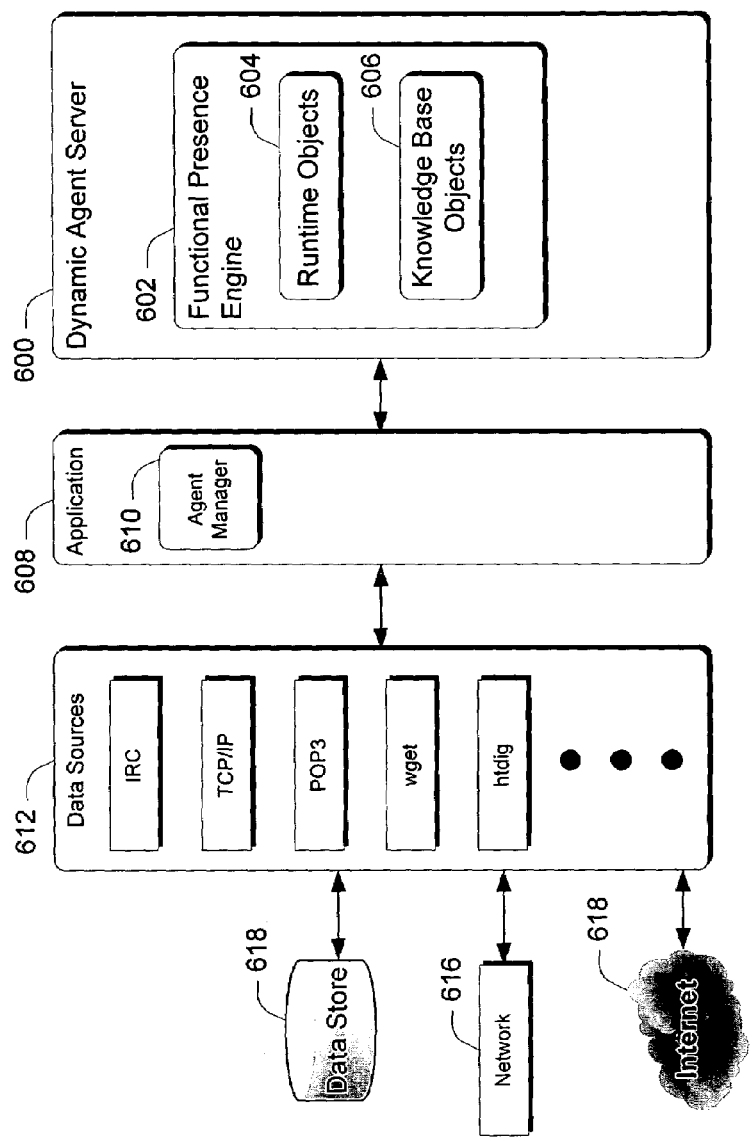
FIG. 6 is a block diagram that illustrates a system in accordance with one embodiment.

As an example, consider FIG. 6 which shows a system comprising a dynamic agent server 600 that comprises or uses a functional presence engine 602 which, in turn, utilizes one or more runtime objects 604 and one or more knowledge base objects 606. An application 608 is provided and includes an agent manager component 610 which manages agents that get created and deployed. One or more data sources 612 are provided and include, in this example, IRC data sources, TCP/IP data sources, POP3 data sources, wget data sources, htdig data sources among others. The data sources can be considered as pipeline through which data passes. In the present example, data can originate or come from the Internet 614, from a network 616 and/or various other data stores 618. Data sources 612 are the pipeline through which the data travels.

In accordance with one embodiment, an agent can be considered as an instance of a runtime object coupled with a data source. In the illustrated and described embodiment, application 608 controls the types of agents that are generated and deployed. In the present example, there are two different types of agents that can be created. A first type of agent gets created and opens a communication channel via a data source and simply listens to a destination such as one of the data origination entities names above, i.e. Internet 614, network 616 and/or data store 618. This type of agent might be considered a passive agent. A second type of agent gets created and opens a communication channel via a data source and interacts in some way with the destination. This second type of agent communicates back through application 608 to the functional presence engine 602. This type of agent might be considered an active agent.

In the illustrated and described embodiment, an agent (i.e. a runtime object 604 and a data source) is associated with one or more knowledge base objects 606. The knowledge base objects define how the agent interacts with data from a data origination entity. That is, the functional presence engine 602 is utilized to direct and control agents. In the illustrated and described embodiment, there is a one-to-one association between a particular runtime object and data source defined by the associated agent.

Because of the componentized nature of the runtime objects, large numbers of agents can be created and deployed across various different types of systems. Additionally, as the runtime objects can be associated with more than one knowledge base, a very robust information processing system can be provided.

As an example, of how the dynamic agent server can be utilized, consider the following example. The wget data source is a mechanism which, in combination with a runtime object, goes to a particular web site and can download the entire web site. That is, the agent in this example establishes a connection with the web site, follows all of the links for the web site, and downloads all of the content of that site. This, in and of itself, can provide a huge data problem insofar as moving from a hard target (the web site) to a very large collection of unstructured data (the entire content of the site). The functional presence engine can alleviate this problem by allowing the agent, in this instance, to go to the website and only pull information that is important by identifying which pages are relevant as defined by the FPML.

Agent Based Information Retrieval Response System

In accordance with another embodiment, the above-described systems and methods can be employed to deploy multiple agents across a network to gather, read, and react to various stores of unstructured data. The system can utilize an analysis tool that tags, indexes and/or otherwise flags relationships in structured and unstructured data for performing alerting, automation and reporting functions either on a desk top system or enterprise wide.

In accordance with one embodiment, the system utilizes a two stage process. In the first stage, the system retrieves information of interest and stores the information in a location that is associated with a particular agent. In the second stage, the system presents a user with an interface by which the user can query the index to find documents of interest.

As will surely be appreciated by the skilled artisan, the systems and methods described above provide a tool that can be utilized to impart to generally unstructured data, a structure that permits a robust and seemingly endless number of operations to be employed on the now-structured data. The various approaches discussed above are generally much simpler and more flexible to other data disambiguation approaches that have been utilized in the past. The examples provided below describe scenarios in which the technology described above can be employed. These examples are not intended to limit application of the claimed subject matter to the specific examples described below. Rather, the examples are intended to illustrate the flexibility that the tools described above provide.

EXAMPLE 1

One important area of application pertains to real time scenarios in which detection of patterns and appropriate response generation takes place. As an example, consider a scenario in which law enforcement individuals wish to search for potential child molesters in chat rooms. Given the vast expanse of cyberspace and the seemingly endless number of chat rooms that serve as forums for child molesters, the task of monitoring these chat rooms and reacting to dialogs from potential molesters is a daunting one. One current approach is to assign a law enforcement individual a small number of chat rooms and have them monitor the chat room for suspicious dialogs. When a suspicious dialog is detected, the law enforcement individual can intervene and attempt to ensnare the potential molester. There are limits on this approach, the most obvious of which is that only a small number of chat rooms can be monitored by any one law enforcement individual. Given the budgetary constraints of many laws enforcement organizations, funds are often not available to place as many law enforcement individuals on this task as are necessary or desirable Using the above-described systems and methods, agents can be deployed to essentially sit in multiple chat rooms and use knowledge bases to monitor and process the dialog that takes place in the chat room. If and when problematic words or patterns are identified the agent can react immediately. In one instance, the agent might notify a human monitor, via an application such as application 608 (FIG. 6), that a pattern has been detected, thus allowing the human monitor to join in the conversation in the chat room and participate in further law enforcement activities. In another instance, the agent might be programmed to engage in a conversation a potential molester and, in parallel, generate an alert for a human monitor.

In this particular instance, the inventive systems and methods are force multipliers in that the ratio of chat room-to-human monitors can be dramatically increased.

EXAMPLE 2

The systems and methods described above can be utilized to develop links and relationships within generally unstructured data. In one example, links are built through proximities—where proximities can be subjects that appear in or at the same media, place, time, and the like. As an example, consider that a subject of interest is "John Doe" and that John Doe is suspected of having a relationship with a certain person of interest "Mike Smith". Yet to date, this relationship has been elusive. Consider now that a system, such as the system of FIG. 6, is set up with agents to monitor various data origination entities for information associated with John Doe and independently, Mike Smith. Assume that during the monitoring of the data origination entities, information is developed that indicates that John Doe went to the Pentagon at 9 P.M. Assume also that in monitoring the data origination entities, information is developed that associates a time range from between 6 P.M. and 11 P.M. with Mike Smith's presence in the Washington D.C. area. Once this information has been developed and processed by the inventive systems described above, as by, for example, being formulated into a table such as the table shown in FIG. 5, a search can be conducted on the table to establish a link or relationship between John Doe and Mike Smith. As noted above, the search can be defined as a simple key word search of the table, or a more robust regular expression search of the table.

EXAMPLE 3

Consider a travel related application in which a user is interested in booking a vacation to a particular destination. Assume that a deployed agent now engages the user in a conversation at a web site that books vacation trips. During the course of the conversation, the user types in certain responses to queries by the agent. For example, the agent may ascertain that the user wishes to book a vacation to Maui and is interested in staying on the north side of the island. Responsive to learning this information, the agent causes multimedia showing the north side of Maui to be presented to the user. As the conversation proceeds, the agent learns other information from the user such as various general activities in which the user likes to participate. For example, the agent may learn that the user likes to hike and explore. Responsive to learning this information, the agent may then cause multimedia associated with hiking and exploring on Maui to be presented to the user as the query continues. Needless to say, the systems and methods described above can be utilized to provide a flexibly robust, user-centric experience.

Active Sentry

In at least one embodiment, the above-described methods and systems can be utilized to enforce network and computer use policy by employing client-side systems that analyze data usage at the client in terms of what the data is, who is using the data, and the context of the data, and then make intelligent decisions on what action(s) to take responsive to the analysis that is performed. In the illustrated and described embodiments, both client-side and server-side components can be employed.

Figure 7:
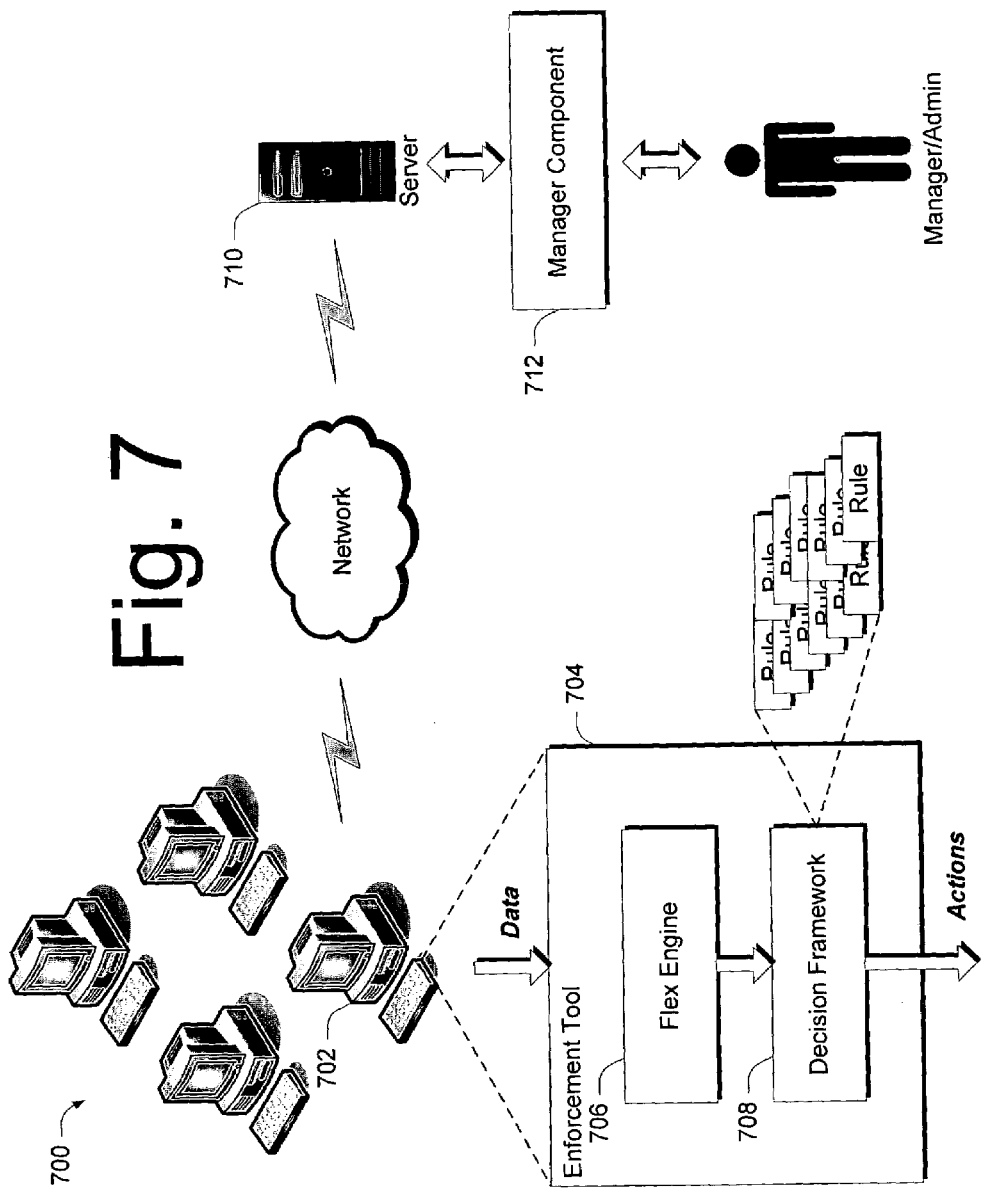
FIG. 7 is a block diagram of an exemplary system in accordance with one embodiment.

As an example, consider FIG. 7, which illustrates an exemplary system 700 in accordance with one embodiment. System 700 comprises, in this example, one or more computing or client devices, an example of which is designated at 702. Individual devices 702 include, in at least one embodiment, an enforcement tool 704 which is configured to enforce network and computer use policy as described below. In this example, enforcement tool 704 comprises a flex engine component 706 and a decision framework 708. In this particular example, enforcement tool 704 is implemented in software in the form of computer-executable instructions that reside on some type of computer-readable media.

Further, system 700 includes a network, which can be any suitable network, and one or more servers 710, and a manager component 712 that enables a manager or administrator to configure enforcement tool 704, as well as receive notifications from the enforcement tool. Each of the flex engine, decision framework and management component is discussed under its own heading below.

Flex Engine

In the illustrated and described embodiment, flex engine 706 is configured much like the functional presence engine described above. In fact, the flex engine draws upon and utilizes the same principles of operation that the functional presence engine utilizes. Here, however, the flex engine 706 is configured to receive data associated with a user's interaction with their particular client device. This data can pertain to a number of different used interactions. For example, the data can pertain to keyboard, clipboard, file system, network, and/or peripheral devices such as CD ROMs, thumb drives and the like.

In the illustrated and described embodiment, the flex engine 706 is programmed by means of FPML, such as that described above. Accordingly, the flex engine uses a similar architectural infrastructure that includes run time objects and knowledge base objects, such as those described in connection with FIGS. 3 and 4.

In this example, each FPML file can contain multiple units which are loaded at runtime into memory. These units comprise input/response units such as those described above. Responsive to a particular user participating in an activity on their computing device, data is produced and provided to the flex engine. The flex engine then parses the data and then individual units of the FPML probabilistically analyze the data to produce a value associated with the data. From this probabilistic analysis, data that is most likely to constitute data of interest is identified (i.e. that data with the highest probabilistic value).

As an example, consider the following. If a particular organization is sensitive to merger and acquisition activity between companies ABC and XYZ, then the flex engine can be configured, via FPML, to look for this type of information on its client devices. Hence, FPML units might be utilized to analyze the text that a user types in a particular email or other application. As the user types in text, the FPML units analyze this text and ascertain probabilistic values associated with the text. In this example, if particular text is ascertained to match or meet criteria described in the FPML, this data is then provided to the decision framework 708 for further analysis.

Thus, in this example, the flex engine and its programmed FPML are used as a data source for the decision framework.

Decision Framework

Having now identified data that meets some particular criteria programmed into the flex engine, decision framework 708 is now used, in this example, as a heuristic, rule-based analyzer that applies one or more rules to the data to ascertain whether one or more actions should be taken. To determine whether one or more actions should be taken, the decision framework 708 can look at the nature of the data, who the user is, and what the user is attempting to do with the data.

The types of actions that can be programmed to be taken by the decision frame 708 can comprise any suitable type of action. For example, one type of action can be making an entry in an event or forensic log. Another type of action might be capturing a particular screen that a user is working on. Further actions can include, by way of example and not limitation, generating email or user notifications, escalating or de-escalating (e.g., adding/removing a local profile), and/or shutting an application/system down.

In at least one embodiment, at the core of the decision framework 708 is an expression language that is utilized to define a set of conditional rules that are applied to data is received from the flex engine 706 to ascertain whether any actions need to be taken.

Management Component

Management component 712 and server 710 can be utilized to configure the flex engine 706 and the decision framework 708. With regard to the decision framework 708, configuration information is received in the form of XML that describes the configuration that the decision framework is to use. One exemplary configuration in XML form is provided below under the heading "Exemplary Configuration XML".

In one embodiment, the configuration information can take the following XML form.

A top level tag <configuration> can contain one or more <profile> tags and one or more <filter> tags. Hence, a configuration can have one or more profiles and one or more filters. A profile contains a set of rules for deciding when certain actions should fire. A filter contains a single rule, keyword list or lex program that can be fed into the decision framework 708.

The <profile> tag can contain one or more <expression> tags, one or more <filter-ref> tags, and/or one or more <action> tags.

An expression can contain one or more <expression> tags and/or one or more <filter-refs> tags, and specifies an operator, such as an AND, OR, NAND, NOR or NOT, for use in its evaluation process.

A filter-ref defines a filter to specify for a particular item. The <filter-ref> tag can contain zero or more <context-items> tags, which individually identifies specific data that a particular associated filter-ref cares about—that is, the context-items describe the types of data that are applied to the specific filter.

An action specifies the type of action that is to be performed and the parameters of the action.

The flex engine 706 can be configured by a manager/administrator using the manager component 712. That is, the manager component 712 provides a user interface through which the appropriate designated individual can build configurations and profiles. In one embodiment, economies are achieved by the server 710 in the configuration building process through the use of a corporate directory, such as an Active Directory. For example, assume that a manager wishes to build a profile for Jane Doe and that Jane Doe belongs to two groups within the organization—the financial group and the managers group. Because the Active Directory maintains relationship information associated with Jane Doe, as well as information associated with the profiles for the financial group and managers group, the manager building the profile need only specify Jane Doe to the manager component, after which the manager component will automatically build Jane Doe's profile from both the profile for the financial group and the managers group. Any conflicts can be mitigated through the intervention of the human manager via the manager component 712.

FIG. 8 is a flow diagram that describes steps in a method in accordance with one embodiment. The method can be implemented in connection with any suitable hardware, software, firmware or combination thereof. In one embodiment, the method is implemented in software and can be implemented utilizing a system, such as one described above.

Step 800 receives data associated with a user's interaction on a client computing device. The data can comprise any suitable data, examples of which are provided above. In but one embodiment, this step can be performed by a component, such as flex engine 706 in FIG. 7. Step 802 probabilistically analyzes the data to provide one or more probabilistic values. Examples of how this can be done are provided above. Step 804 applies one or more heuristics associated with the data to ascertain whether one or more action should be taken. In but one embodiment, this step can be performed by a decision framework, such as decision framework 708 in FIG. 7. Step 806 takes one or more actions responsive to applying one or more heuristics. Examples of actions that can be taken are given above. Other actions can be taken without departing from the spirit and scope of the claimed subject matter.

Exemplary Configuration XML

To provide some context for the discussion above, consider the following XML excerpt which describes configuration information that can be utilized to configure the decision framework 708 in accordance with one embodiment.

```
<?xml version="1.0" encoding="utf-8" ?>
<!-- Configuration XML version 0.2 example-->
<!-- The configuration is the top level tag.
    Attributes:
    Contains:
        one or more profile tags.
        one or more filter tags.
-->
<configuration>
    <!-- A configuration has one or more profiles and one or more
filters. -->
    <!-- A filter contains a single rule, keyword list, or lex
program that can be fed into the decision framework.
        Attributes:
            name = A unique name for the filt4er in this
configuration
            type = One of "pattern | keyword-list | lex-
program"
        Contains:
            CDATA containing the rules
    -->
    <filter id="fred" type="pattern" >
        <!-- Validates 9 digit numbers, ignoring any number that
starts with 0 or 8. -->
        <![CDATA[
            ([^\.0-9a-zA-Z]|^)[12345679](\d{2}(-|\s)\d{3}(-
|\s)\d{3}|\d{8})([^\.0-9a-zA-Z]|\.|$)
        ]]>
    </filter>
    <filter id="jeff" type="keyword-list">
        <!-- -->
        <![CDATA[
            // a /n separated list of terms.
        ]]>
    </filter>
    <filter id="brandon" type="lex-program">
        <!-- -->
        <![CDATA[
            // a pile of regexes mapped to named tokens
(valid lex file format)
        ]]>
    </filter>
    <!-- The profile contains a set of rules for deciding when
certain actions should fire.
        Attributes:
            id = a guid that uniquely identifies this
profile.
            occurance = the number of time that a match must
occur to fire the Actions
            duration = The length of time in which to
accumulate occurance to make a match.
            threshold = level of the profile used to
determine if the profile is active in the default state or in an
escalated state.
            feedback = if present this affects the watcher
that initiated the evaluation of this config. The default behavior is
to allow. If one profile returns deny, then decision framework returns
'deny' to the watcher that initiated the eval.
        Contains:
            one expression,
            one or more filter-refs,
            one or more actions to perform if one or more of
the filters/expressions are satisfied.
    -->
    <profile id="D3195E40-2EE4-44f2-884D-0331D66C576F"
occurance="1" duration="300" threshhold="1" feedback="allow | deny">
        <!-- An expression contains one or more expressions
and/or one or more filter-refs, and specifies an operator for
combination.
            Attributes:
                op= one of "AND | OR | NAND | NOR | NOT"
                proximity = The number of items
maximally separating items in the expression.
                scope = paragraph | sentence | word.
            Contains:
                one or more filter-refs
                one or more expressions
        -->
        <expression op="AND" proximity="1"
scope="document|paragraph|sentence|word" >
            <!-- A filter-ref defines the filter to specify
for this item.
                Attributes:
                    refid = The id of a filter
defined in this configuration.
                Contains:
                    zero or more context-items to
specify the source of the data.
            -->
            <filter-ref refid ="fred">
                <!-- context-item identifies specific
data that this filter ref cares about.
                -->
                <!-- Context items describe the types of
data that are applied to specific filter-refs.
                    Atributes:
                        name = the type of
context data
                    Contains:
                        nothing
                    All the currently defined context
item types are enumerated below.
                -->
                <!-- keyboard watcher -->
                <context-item name="keyboard-value" />
                <!-- clipboard watcher -->
                <context-item name="clipboard-current-
text" />
                <context-item name="clipboard-source-
app" />
                <context-item name="clipboard-source-
```

```
                    window" />
                            <context-item name="clipboard-data-
changing" />
                            <context-item name="clipboard-dest-app"
/>
                            <context-item name="clipboard-dest-
window" />
                            <!-- drag-drop watcher -->
                            <context-item name="drag-drop-current-
text" />
                            <context-item name="drag-drop-source-
app" />
                            <context-item name="drag-drop-dest-app"
/>
                            <!-- application watcher -->
                            <context-item name="current-app-path" />
                            <context-item name="current-app-window-
title" />
                            <context-item name="current-app-pid" />
                            <context-item name="current-app-focus-
in" />
                            <context-item name="current-app-focus-
out" />
                            <!-- file watcher -->
                            <context-item name="file-path" />
                            <context-item name="file-requested-
access" />
                            <context-item name="file-pid-owner" />
                            <!-- outlook watcher -->
                            <context-item name="email-header-to" />
                            <context-item name="email-header-from"
/>
                            <context-item name="email-header-cc" />
                            <context-item name="email-header-bcc" />
                            <context-item name="email-header-
subject" />
                            <context-item name="email-body" />
                            <context-item name="email-attachments"
/>
                            <!-- internet explorer watcher -->
                            <context-item name="browser-url" />
                            <context-item name="browser-body" />
                        </filter-ref>
                    </expression>
                    <!-- An action tag specifies the type of action to
perform and the parameters of the action. The action contains an item
tag whose attributes and contents depend on the type of action.
                        Attributes:
                            name = the name of the action to invoke.
                            run-first = optional, if 'true', then
all actions invoked by this profile do not start until this action is
completed. immediately after this action.
                            run-last = optional, if 'true', this
action runs after all other actions in the profile are complete.
                            other optional attributes depend on the
name of the action.
                        Contains:
                            depends on the action
                        All the currently defined action types are
enumerated below.
                    -->
                    <!-- Singly Occuring actions -->
                    <action name="log-event" run-first="true" />
                    <action name="email-notification" dest-
address="admin@mycompany.com">
                        User has violated policy x
                    </action>
                    <action name="user-notification">
                        An action has occurred that violates the policy
rules for use of this system. Don't do it again!
                    </action>
                    <action name="user-query">
                        An action inconsistent with the policy rules of
this system has been detected. Please explain your behavior.
                    </action>
                    <!-- display-capture action
                        Attributes:
                            area = the portion of the display that should
be captured. Possible values are:
                                desktop - The entire desktop of this
user. This is a good choice for repeated capture because multiple
display-capture invocations (from different profiles) may be able to
share references to the same captured desktop image.
                                foreground-window - The active window at
the time of the capture. This can vary significantly from the window
option below, especially in a scheduled, asynchronous action.
                                window - (default) The window which was
the target in the event which caused this action. Where the
foreground-window option captures the active window at the time of the
capture, whichever window that happens to be, the window option always
captures the same window.
                            flex = the allowed age of the capture image
given in milliseconds. This applies only to desktop captures, and
indicates when the capture notification may reference an image that was
previously refernced by another capture without uploading a separate
image. The default value for flex is 500 (0.5 sec).
                    -->
                    <action name="display-capture" area="desktop"
flex="2000" />
                    <!-- Multiply-occuring actions -->
                    <action name="forensic-log" duration="300" />
                    <action name="escalate" ecalation-path-id="015068FA-
CD71-4772-ADE9-A1656339D8B4" increment="1" duration="300" />
                    <!-- shutdown actions -->
                    <action name="shutdown-application" />
                    <action name="logoff-user" />
                    <action name="shutdown-system" />
                </profile>
                <!-- escalation paths associate different profiles with each
other by listing the order of activation of the profiles. Profile
references are listed in order of escalation. Each profile that can be
escalated contains an action that identifies the escalation path to
reference for the escalation action. An escalation path contains two or
more profile-refs. A profile should only have a single reference
within an escalation path.
                    Attributes:
                        id = a guid that uniquely identifies this
escalation-path.
                    Contains:
                        two or more profile-refs
                -->
                <escalation-path
id="015068FA-CD71-4772-ADE9-A1656339D8B4" >
                    <profile-ref id="D3195E40-2EE4-44f2-884D-0331D66C576F"
/>
                    <profile-ref id="another profile id" />
                </escalation-path>
</configuration>
```

CONCLUSION

In the embodiments described above, network and computer use policy is enforced by employing client-side systems that analyze data usage at the client in terms of what the data is, who is using the data, and the context of the data, and then make an intelligent decision on what action(s) to take responsive to the analysis that is performed. Such systems and related methods can protect organizational resources from inappropriate activities that originate from within the organization.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
   receiving from a client computing device data associated with a user's interaction with the client computing device, wherein the client computing device is connected to a computer network that has a network policy;
probabilistically analyzing, by the client computing device, the data to ascertain whether the data constitutes data of interest, wherein the data comprises data of interest when it pertains to a policy selected from the group consisting of the network policy for the network and a computer use policy of the client computing device, and wherein probabilistically analyzing comprises:
performing lexical analysis on the data;
matching one or more portions of the received data with one or more cases of data defined in one or more pre-defined files; and
assigning a score to the received data based at least in part on the matching, the score indicative of whether the data constitutes data of interest,
wherein individual pre-defined files are defined in a hierarchical tag-based language comprising a first top level tag encompassing multiple other tags including:
a second tag specifying a file to be used to perform the lexical analysis; and
a third tag specifying individual cases of data and having sub-tags identifying text patterns that are attempted to be matched and associated responses triggered in an event of a match; and in an event the data constitutes data of interest, applying one or more rules to ascertain whether any actions should be taken responsive to the user's interaction with the client computing device, wherein one or more actions are taken independent of input from the user with regard to the one or more actions
determining, by the client computer device, whether to apply a rule to take one or more actions when it is determined that the data is data of interest based on one or more rule set profiles that define when an action should be triggered; and
receiving, by the client computer device, configuration data for the one or more rule set profiles from a remote computer device connected to the client computer device via the computer network.

2. The method of claim 1, wherein the data is associated with a user's keyboard interaction.

3. The method of claim 1, wherein the data is associated with a user's clipboard interaction.

4. The method of claim 1, wherein the data is associated with a user's file system interaction.

5. The method of claim 1, wherein the data is associated with a user's network interaction.

6. The method of claim 1, wherein the data is associated with a user's interaction with one or more peripheral devices.

7. The method of claim 1, wherein an action comprises making an entry in a log.

8. The method of claim 1, wherein an action comprises capturing a screen associated with the user's interaction.

9. The method of claim 1, wherein an action comprises generating a notification.

10. The method of claim 1, wherein an action comprises shutting down an application.

11. The method of claim 1, wherein an action comprises shutting down the client computing device.

12. The method of claim 1, wherein the act of probabilistically analyzing further comprises using:
one or more runtime objects that are configured to receive and process data, and
one or more knowledge base objects, individual knowledge base objects being associated with one or more runtime objects;
wherein individual knowledge base objects are associated with individual pre-defined files.

13. The method of claim 12, wherein knowledge base objects are configured to process data received from runtime objects and return the score and an indication of an associated node that generated the score to runtime objects from which the data was received.

14. A system comprising:
a first computer device; and
a client computer device connected to the first computer device via a computer network that has a network policyv, wherein the client computer device comrrises:
one or more computer-readable media;
computer-readable instructions stored in the computer-readable media which, when executed, implement a system comprising:
an engine component configured to receive data associated with a user's interaction with the client computing device and probabilistically analyze the data to ascertain whether the data constitutes data of interest, wherein the data constitutes data of interest when it pertains to one or more of the network policy and a computer use policy of the client computing device wherein the engine is configured to probabilistically analyze the data by performing the following:
lexical analysis on the data;
matching one or more portions of the data with one or more cases of data defined in one or more pre-defined files; and
assigning a score to the data based at least in part on the matching, the score indicative of whether the data constitutes data of interest,
wherein individual pre-defined files are defined in a hierarchical tag-based language comprising a first top level tag encompassing multiple other tags including:
a second tag specifying a file to be used to perform the lexical analysis; and
a third tag specifying individual cases of data and having sub-tags identifying text patterns that are attempted to be matched and associated responses triggered in an event of a match; and
a decision framework component communicatively coupled with the engine component and configured to, in an event the data constitutes data of interest, apply one or more rules based on one or more rule set policies to ascertain whether any actions should be taken responsive to the user's interaction, wherein one or more actions are taken independent of input from the user with regard to the one or more actions;
wherein the first computer device is programmed to transmit configuration data to the client computer device for the one or more rule set profiles via the computer network.

15. The system of claim 14, wherein the data is associated with one or more of a user's keyboard interaction, a user's clipboard interaction, a user's file system interaction, a user's network interaction, or a user's interaction with one or more peripheral devices.

16. The system of claim 14, wherein an action comprises one or more of making an entry in a log, capturing a screen associated with the user's interaction, generating a notification, shutting down an application, and shutting down the client computing device.

17. The system of claim 14, wherein the engine component comprises:
- one or more runtime objects that are configured to receive and process data, and
- one or more knowledge base objects, individual knowledge base objects being associated with one or more runtime objects;
- wherein individual knowledge base objects are associated with individual pre-defined files.

18. The system of claim 17, wherein knowledge base objects are configured to process data received from runtime objects and return the score and an indication of an associated node that generated the score.

19. A computer-implemented method comprising:
- receiving, at a client computing device from a first computer device via a computer network, configuration information that describes one or more heuristics that are to be applied to data associated with a user's interactions on the client computing device, the configuration information being structured in a hierarchical, tag-based language, wherein the hierarchical tag-based language comprises a top level tag that can contain a profile tag associated with a set of rules for deciding when certain actions should be taken, and a filter tag associated with a single rule, keyword or lexical program;
- using the configuration information to remotely configure a decision framework component of the client computing device;
- receiving, with an engine component of the client computing device, data associated with a user's interaction with the client computing device;
- probabilistically analyzing, with the engine component of the client computing device, the data to ascertain whether the data constitutes data of interest, wherein the data constitutes data of interest if it pertains to one or more of a network policy of the computer network and a computer use policy of the client computing device, and wherein probabilistically analyzing comprises:
  - matching one or more portions of the data with one or more cases of data defined in one or more pre-defined files; and
  - assigning a score to the data based at least in part on the matching and indicative of whether the data constitutes data of interest; and
- in an event the data constitutes data of interest, applying, with the configured decision framework component of the client computing device, one or more rules to ascertain whether any actions should be taken responsive to the user's interaction with the client computing device, wherein one or more actions are taken independent of input from the user with regard to the one or more actions.

20. The method of claim 19, wherein the data is associated with one or more of a user's keyboard interaction, a user's clipboard interaction, a user's file system interaction, a user's network interaction, or a user's interaction with one or more peripheral devices.

21. The method of claim 19, wherein an action comprises one or more of making an entry in a log, capturing a screen associated with the user's interaction with the client computing device, generating a notification, shutting down an application, and shutting down the client computing device.

22. The method of claim 19, wherein the profile tag contains one or more of an expression tag associated with an expression that is to be used to evaluate data, a filter reference tag associated with a filter that can be applied to the data, and an action tag associated with a type of action that can be performed.

23. The method of claim 22, wherein filter reference tags contains a context item tag which is associated with specific data that are applied to a filter associated with filter reference tags.

* * * * *